United States Patent
Wang et al.

(10) Patent No.: US 12,079,950 B2
(45) Date of Patent: Sep. 3, 2024

(54) IMAGE PROCESSING METHOD AND APPARATUS, SMART MICROSCOPE, READABLE STORAGE MEDIUM AND DEVICE

(71) Applicant: TENCENT TECHNOLOGY (SHENZHEN) COMPANY LIMITED, Guangdong (CN)

(72) Inventors: Liang Wang, Shenzhen (CN); Jia Rui Sun, Shenzhen (CN); Yan Chun Zhu, Shenzhen (CN); Jianhua Yao, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 407 days.

(21) Appl. No.: 17/685,860

(22) Filed: Mar. 3, 2022

(65) Prior Publication Data

US 2022/0309610 A1    Sep. 29, 2022

Related U.S. Application Data

(63) Continuation of application No. PCT/CN2020/027037, filed on Nov. 6, 2020.

(30) Foreign Application Priority Data

Feb. 14, 2020   (CN) .......................... 202010095182.0

(51) Int. Cl.
  *G06T 3/40*   (2024.01)
  *G06T 7/11*   (2017.01)
  (Continued)

(52) U.S. Cl.
  CPC .................. *G06T 3/40* (2013.01); *G06T 7/11* (2017.01); *G06V 10/44* (2022.01); *G06V 10/764* (2022.01); *G06T 2207/10056* (2013.01)

(58) Field of Classification Search
  CPC ... G06T 3/40; G06T 7/11; G06T 2207/10056; G06V 20/69; G06V 10/75; G06V 10/82; G06V 10/52; G06V 10/764; G06V 10/44
  See application file for complete search history.

(56) References Cited

U.S. PATENT DOCUMENTS 7,801,352 B2 *   9/2010   Uchiyama ............ G02B 21/367
                                                382/257
10,108,867 B1 * 10/2018   Vallespi-Gonzalez ......................
                                                G06V 20/58

(Continued)

FOREIGN PATENT DOCUMENTS

CN   109034208 A   12/2018
CN   110310253 A   10/2019

(Continued)

OTHER PUBLICATIONS

International Search Report of PCT/CN2020/127037 dated Jan. 27, 2021 [PCT/ISA/210].

(Continued)

*Primary Examiner* — Congvan Tran
(74) *Attorney, Agent, or Firm* — Sughrue Mion, PLLC

(57) ABSTRACT

A method is provided and includes acquiring a digital slide comprising objects of at least two sizes, the objects including a first object of a first size and a second object of a second size different from the first size, for each of the first object and the second object, acquiring images of a corresponding object in at least two scales based on the digital slide, where the acquired images of the corresponding object in the at least two scales include an image of a larger scale and an image of a smaller scale, the image of the larger scale having a smaller image size and a higher image resolution than the image of the smaller scale, and determining, from the images of the corresponding object in the at least two (Continued)

scales, an image having an image size that corresponds to a size of the corresponding object.

20 Claims, 11 Drawing Sheets

(51) Int. Cl.
*G06V 10/44* (2022.01)
*G06V 10/764* (2022.01)

(56) References Cited

U.S. PATENT DOCUMENTS

| | | | |
|---|---|---|---|
| 10,255,525 B1* | 4/2019 | Totolos, Jr. ............ | B60W 30/09 |
| 2011/0164042 A1* | 7/2011 | Chaudhri .............. | G06F 3/0481 |
| | | | 715/702 |
| 2017/0243051 A1* | 8/2017 | Chukka ................ | G06F 18/254 |

FOREIGN PATENT DOCUMENTS

| CN | 111325263 A | 6/2020 |
|---|---|---|
| EP | 2 336 972 A1 | 6/2011 |

OTHER PUBLICATIONS

Written Opinion of PCT/CN2020/127037 dated Jan. 27, 2021 [PCT/ISA/237].

\* cited by examiner

IMAGE PROCESSING METHOD AND APPARATUS, SMART MICROSCOPE, READABLE STORAGE MEDIUM AND DEVICE

CROSS-REFERENCE TO RELATED APPLICATION(S)

This application is a continuation application of International Application No. PCT/CN2020/127037, filed on Nov. 6, 2020, which claims priority to Chinese Patent Application No. 202010095182.0, filed with the China National Intellectual Property Administration on Feb. 14, 2020, the entire contents of which are incorporated by reference herein.

FIELD

This disclosure relates generally to the field of image processing technologies, and in particular, to an image processing method and apparatus, an intelligent microscope (or smart microscope), a computer-readable storage medium, and a computer device.

BACKGROUND

With development of an image processing technology, an image classification processing technology is provided, and the technology may be applied to recognition and classification processing on a to-be-classified object such as a mammary duct in a digital slide. The digital slide is a high-resolution digital image obtained by scanning a conventional glass slide by using an intelligent microscope (or smart microscope) or the like. High-precision and multifield of view concatenation processing may be further performed on the digital slide on a computer device.

However, currently, a related image classification processing technology that is applied to classification of a to-be-classified object in a digital slide generally performs classification processing on to-be-classified object in the digital slide at a specific scale. However, because the digital slide generally includes factors such as to-be-classified objects of multiple sizes, accuracy of classifying the to-be-classified objects in the digital slide by using this technology is relatively low.

SUMMARY

Provided are an image processing method and apparatus, an intelligent microscope (or smart microscope), a computer-readable storage medium, and a computer device.

In accordance with an aspect of an example embodiment of the disclosure, an image processing method, performed by at least one processor, may include acquiring a digital slide including objects of at least two sizes, the objects comprising a first object of a first size and a second object of a second size different from the first size, for each of the first object and the second object, acquiring images of a corresponding object in at least two scales based on the digital slide, where the acquired images of the corresponding object in the at least two scales include an image of a larger scale and an image of a smaller scale, the image of the larger scale having a smaller image size and a higher image resolution than the image of the smaller scale, for each of the first object and the second object, determining, from the images of the corresponding object in the at least two scales, an image having an image size that corresponds to a size of the corresponding object, obtaining a first classification result of the first object by classifying the first object in the determined image for the first object based on a classification model corresponding to a first image resolution of the determined image for the first object, obtaining a second classification result of the second object by classifying the second object in the determined image for the second object based on a classification model corresponding to a second image resolution of the determined image for the second object, and obtaining classification results of the first object and the second object by fusing the first classification result and the second classification result.

In accordance with an aspect of an example embodiment of the disclosure, an apparatus may include at least one memory configured to store computer program code, and at least one processor configured to access said computer program code and operate as instructed by said computer program code, said computer program code including first acquiring code configured to cause the at least one processor to acquire a digital slide including objects of at least two sizes, the objects including a first object of a first size and a second object of a second size different from the first size, second acquiring code configured to cause the at least one processor to, for each of the first object and the second object, acquire images of a corresponding object in at least two scales based on the digital slide, where the acquired images of the corresponding object in the at least two scales include an image of a larger scale and an image of a smaller scale, the image of the larger scale having a smaller image size and a higher image resolution than the image of the smaller scale, first determining code configured to cause the at least one processor to, for each of the first object and the second object, determine, from the images of the corresponding object in the at least two scales, an image having an image size that corresponds to a size of the corresponding object, first obtaining code configured to cause the at least one processor to obtain a first classification result of the first object by classifying the first object in the determined image for the first object based on a classification model corresponding to a first image resolution of the determined image for the first object, second obtaining code configured to cause the at least one processor to obtain a second classification result of the second object by classifying the second object in the determined image for the second object based on a classification model corresponding to a second image resolution of the determined image for the second object, third obtaining code configured to cause the at least one processor to obtain classification results of the first object and the second object by fusing the first classification result and the second classification result.

In accordance with an aspect of an example embodiment of the disclosure, a non-transitory computer-readable storage medium may store computer instructions that, when executed by at least one processor of a device, cause the at least one processor to acquire a digital slide including objects of at least two sizes, the objects including a first object of a first size and a second object of a second size different from the first size, for each of the first object and the second object, acquire images of a corresponding object in at least two scales based on the digital slide, where the acquired images of the corresponding object in the at least two scales include an image of a larger scale and an image of a smaller scale, the image of the larger scale having a smaller image size and a higher image resolution than the image of the smaller scale, for each of the first object and the second object, determine, from the images of the corresponding object in the at least two scales, an image having an image size that corresponds to a size of the corresponding object, obtain a first classification result of the first object by classifying the first object in the determined image for the first object based on a classification model corresponding to a first image resolution of the determined image for the first object, obtain a second classification result of the second object by classifying the second object in the determined image for the second object based on a classification model corresponding to a second image resolution of the determined image for the second object, and obtain classification results of the first object and the second object by fusing the first classification result and the second classification result.

In an embodiment, an embodiment of the present disclosure provides an image processing apparatus, and the apparatus includes: a slide acquiring module, configured to acquire a digital slide that includes to-be-classified objects of at least two sizes; an image acquiring module, configured to acquire images of the to-be-classified object in at least two scales according to the digital slide; in the images of the to-be-classified object in the at least two scales, an image of a larger scale having a smaller image size and a higher image resolution than an image of a smaller scale; an image matching module, configured to use, as a to-be-classified image of the to-be-classified object, an image whose image size matches a size of the to-be-classified object in the images of the to-be-classified object in the at least two scales; a result acquiring module, configured to classify the to-be-classified object in the to-be-classified image based on a classification model corresponding to an image resolution of the to-be-classified image, to obtain a classification result of a to-be-classified object of each size; and a result fusion module, configured to fuse the classification result of the to-be-classified object of each size to obtain classification results of the to-be-classified objects of the at least two sizes in the digital slide.

In an embodiment, an embodiment of the present disclosure provides an intelligent microscope, including an image scanning device and an image analysis device. The image scanning device is configured to scan a to-be-classified object to obtain a digital slide of the to-be-classified object, and transmit the digital slide to the image analysis device; and the image analysis device is configured to perform the steps of the image processing method described above.

In an embodiment, an embodiment of the present disclosure provides one or more non-volatile storage media that store computer-readable instructions, when executed by one or more processors, causing the processor to perform the following steps: acquiring a digital slide that includes to-be-classified objects of at least two sizes; acquiring images of the to-be-classified object in at least two scales according to the digital slide; in the images of the to-be-classified object in the at least two scales, an image of a larger scale having a smaller image size and a higher image resolution than an image of a smaller scale; using, as a to-be-classified image of the to-be-classified object, an image whose image size matches a size of the to-be-classified object in the images of the to-be-classified object in the at least two scales; classifying the to-be-classified object in the to-be-classified image based on a classification model corresponding to an image resolution of the to-be-classified image, to obtain a classification result of a to-be-classified object of each size; and fusing the classification result of the to-be-classified object of each size to obtain classification results of the to-be-classified objects of the at least two sizes in the digital slide.

In an embodiment, an embodiment of the present disclosure provides a computer device, including a memory and a processor. The memory stores computer-readable instructions, when executed by the processor, causing the processor to perform the following steps: acquiring a digital slide that includes to-be-classified objects of at least two sizes; acquiring images of the to-be-classified object in at least two scales according to the digital slide; in the images of the to-be-classified object in the at least two scales, an image of a larger scale having a smaller image size and a higher image resolution than an image of a smaller scale; using, as a to-be-classified image of the to-be-classified object, an image whose image size matches a size of the to-be-classified object in the images of the to-be-classified object in the at least two scales; classifying the to-be-classified object in the to-be-classified image based on a classification model corresponding to an image resolution of the to-be-classified image, to obtain a classification result of a to-be-classified object of each size; and fusing the classification result of the to-be-classified object of each size to obtain classification results of the to-be-classified objects of the at least two sizes in the digital slide.

BRIEF DESCRIPTION OF THE DRAWINGS

In order to describe the technical solutions in the example embodiments of the disclosure more clearly, the following briefly describes the accompanying drawings for describing the example embodiments. Apparently, the accompanying drawings in the following description merely show some embodiments of the disclosure, and a person of ordinary skill in the art may still derive other accompanying drawings from these accompanying drawings without creative efforts.

DETAILED DESCRIPTION

To make objectives, technical solutions, and advantages of this disclosure clearer and more comprehensible, this disclosure is further described in detail with reference to the accompanying drawings and embodiments. It is to be understood that the specific embodiments described herein are only used for explaining this disclosure, and are not used for limiting this disclosure.

Artificial intelligence (AI) is a theory, method, technology, and application system in which a digital computer or a machine controlled by a digital computer is used to simulate, extend, and expand human intelligence, sense an environment, acquire knowledge, and use the knowledge to obtain an optimal result.

In other words, the AI is a comprehensive technology of computer science, which attempts to understand essence of intelligence and produces a new intelligent machine that can respond in a manner similar to human intelligence. The AI is to study the design principles and implementation methods of various intelligent machines, to enable the machines to have the functions of perception, reasoning, and decision-making.

The AI technology is a comprehensive discipline, covering a wide range of fields including both a hardware-level technology and a software-level technology. Basic AI technologies generally include technologies such as sensors, dedicated AI chips, cloud computing, distributed storage, big data processing technologies, operating and interaction systems, and mechatronics. AI software technologies mainly include several major directions such as a computer vision technology, a speech processing technology, a natural language processing technology, and machine learning and deep learning (DL).

A digital slide, also referred to as a virtual slide, includes lesion information on a glass slide. The digital slide may be scaled on a computer device such as a personal computer. On the computer device, any position on the glass slide may be observed by using the digital slide, or a corresponding position may be further scaled up to, for example, 5 times, 10 times, 20 times, and 40 times, as in a conventional microscope.

Figure 1:
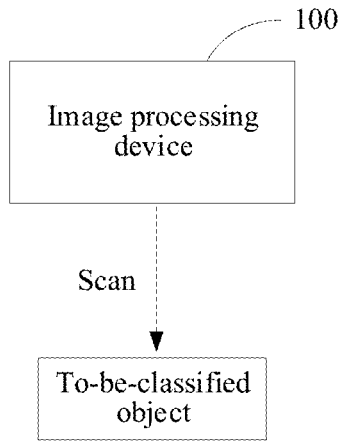
FIG. 1 is a diagram of an image processing method according to an embodiment.

FIG. 1 is a diagram of an image processing method according to an embodiment. The image processing method provided in this disclosure may be applied to an application environment shown in FIG. 1. FIG. 1 is an application environment diagram of an image processing method in an embodiment. The application environment may include an image processing device 100. The image processing device 100 may be a computer device that has an image processing capability such as image collection, analysis, and display. The computer device may be specifically at least one of a mobile phone, a tablet computer, a desktop computer, or a laptop computer. In addition, the image processing device 100 may further be an intelligent microscope (or smart microscope). The intelligent microscope incorporates visual, voice, natural language processing technology, and an augmented reality (AR) technology of artificial intelligence. A user may input a control instruction such as a voice instruction to the intelligent microscope, and the intelligent microscope may perform an operation such as automatic identification, detection, quantitative calculation, and report generation according to the instruction, or may display a detection result in real time in a field of view shown in an eyepiece of the user, and remind the user in time without disturbing a process of reading a picture, thereby improving processing efficiency and accuracy.

Specifically, according to the image processing method provided in this disclosure, the image processing device 100 may acquire, in a scanning manner or the like, a digital slide that includes to-be-classified objects of at least two sizes, and acquire images of the to-be-classified object in at least two scales according to the digital slide; in the images of the to-be-classified object in the at least two scales, an image of a larger scale having a smaller image size and a higher image resolution than an image of a smaller scale. Then, the image processing device 100 may use, as a to-be-classified image of the to-be-classified object, an image whose image size matches (or corresponds to) a size of the to-be-classified object in the images of the to-be-classified object in at least two scales. Then, the image processing device 100 may first acquire a classification model corresponding to an image resolution of the to-be-classified image. The classification model may be preconfigured in the image processing device 100. Then, the image processing device 100 may classify the to-be-classified object in the to-be-classified image based on the classification model corresponding to the image resolution of the to-be-classified image, such that a classification result of the to-be-classified object of each size may be obtained separately. Finally, the image processing device 100 fuses the classification result of the to-be-classified object of each size to obtain classification results of the to-be-classified objects of the at least two sizes in the digital slide. The method may be applied to an image processing device such as a computer device or an intelligent microscope, so as to accurately classify to-be-classified objects of at least two sizes included in a digital slide, thereby improving accuracy of classifying the to-be-classified objects in the digital slide.

In the application scenario shown in FIG. 1, the image processing device 100 may be used for locally scanning a to-be-classified object, and perform classification processing on to-be-classified objects of multiple sizes in a digital slide obtained by means of scanning. In addition, classification processing of the to-be-classified object may be completed in a remote communication manner. For example, non-local classification processing of a to-be-classified object may be implemented based on a fifth-generation (5G) mobile communications technology (5G mobile networks or 5G wireless systems, or 5G technology). A user may acquire a digital slide including a to-be-classified object by using a terminal device such as a mobile phone or a tablet computer, and then transmit the digital slide to a remote image processing device 100 in real time based on a 5G communications network. Then, the image processing device 100 may perform classification processing on the to-be-classified object in the digital slide, and transmit a classification result to a terminal device of the user by using the 5G communications network, such that the user can master the classification result by using the terminal device, which benefits from a strong real-time characteristic of the 5G communication technology. Even if the remote image processing device 100 performs classification processing on a to-be-classified object of a digital slide collected by the user onsite, the user can acquire a corresponding classification result in real time onsite, and under a condition of ensuring real-time performance, image data processing pressure at the user end can be reduced.

The image processing method provided by this disclosure is further described below with reference to the accompanying drawings and embodiments.

Figure 2:
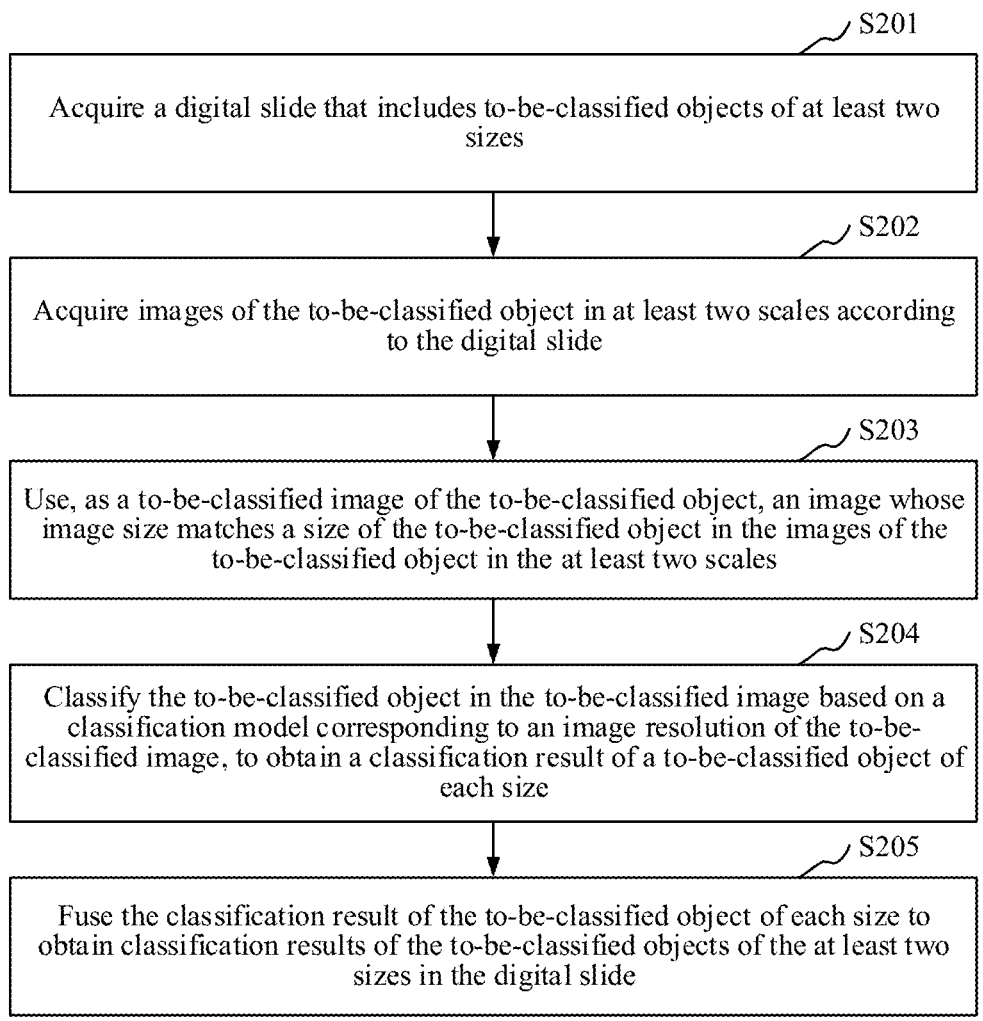
FIG. 2 is a flowchart of an image processing method according to an embodiment.

FIG. 2 is a flowchart of an image processing method according to an embodiment. In an embodiment, an image processing method is provided. As shown in FIG. 2, FIG. 2 is a schematic flowchart of an image processing method according to an embodiment. This embodiment is mainly described by using an example in which the method is applied to the image processing device 100 in FIG. 1. For the foregoing description of the image processing device 100 in FIG. 1, the image processing device 100 may specifically use a computer device such as a mobile phone, a tablet computer, a desktop computer, and a laptop computer that have an image processing capability such as image collection, analysis, and display. Referring to FIG. 2, the image processing method specifically includes the following operations:

In operation S201, the system acquires a digital slide that includes to-be-classified objects of at least two sizes.

In this operation, the image processing device 100 may scan the to-be-classified object by using the image scanning device to acquire a digital slide of the to-be-classified object. The image scanning device may be used as a part of the image processing device 100, or may be used as an external device of the image processing device 100. The image scanning device may scan, under control of the image processing device 100, a carrier of the to-be-classified object such as a glass slide to acquire a digital slide of the to-be-classified object and transmit the digital slide to the image processing device 100 for analysis processing. The digital slide may be a whole slide image (WSI), and may be arbitrarily zoomed in and out on the image processing device 100.

The digital slide obtained by the image processing device 100 generally includes to-be-classified objects of at least two sizes. The image processing device 100 may mark to-be-classified objects of different sizes for distinction after acquiring a digital slide that includes the to-be-classified objects of the at least two sizes. Using a mammary duct as a to-be-classified object is used as an example. The mammary duct may be divided into two sizes according to a size threshold. A mammary duct whose size is greater than the size threshold may be used as a large duct, and a mammary duct whose size is less than the size threshold is used as a small duct. For example, the image processing device 100 may mark a mammary duct that occupies 2048 pixels or more under a 20× magnification as a large duct, and mark a mammary duct that occupies less than 2048 pixels under a 20× magnification as a small duct.

In operation S202, the system acquires images of the to-be-classified object in at least two scales according to the digital slide.

In this operation, the image processing device 100 may acquire images of the to-be-classified object in at least two scales according to the digital slide; in the images of the to-be-classified object in the at least two scales, an image of a larger scale having a smaller image size and a higher image resolution than an image of a smaller scale. Actual physical sizes corresponding to pixels in images of different scales are the same, such that a to-be-classified object corresponds to the same physical size in images of different scales.

Specifically, the image processing device 100 may perform scaling processing on the digital slide to acquire images of the to-be-classified object in different scales. A scale may be corresponding to a magnification of a microscope. A larger magnification indicates a larger scale, and vice versa. For example, a 20× magnification has a larger scale than a 5× magnification.

In the images of the to-be-classified object that are acquired by the image processing device 100 at different scales, an image with a larger scale has a relatively small image size and a relatively high image resolution. For example, a 5× magnification and a 20× magnification are used as two scales, and a mammary duct is used as a to-be-classified object.

Figure 3A:
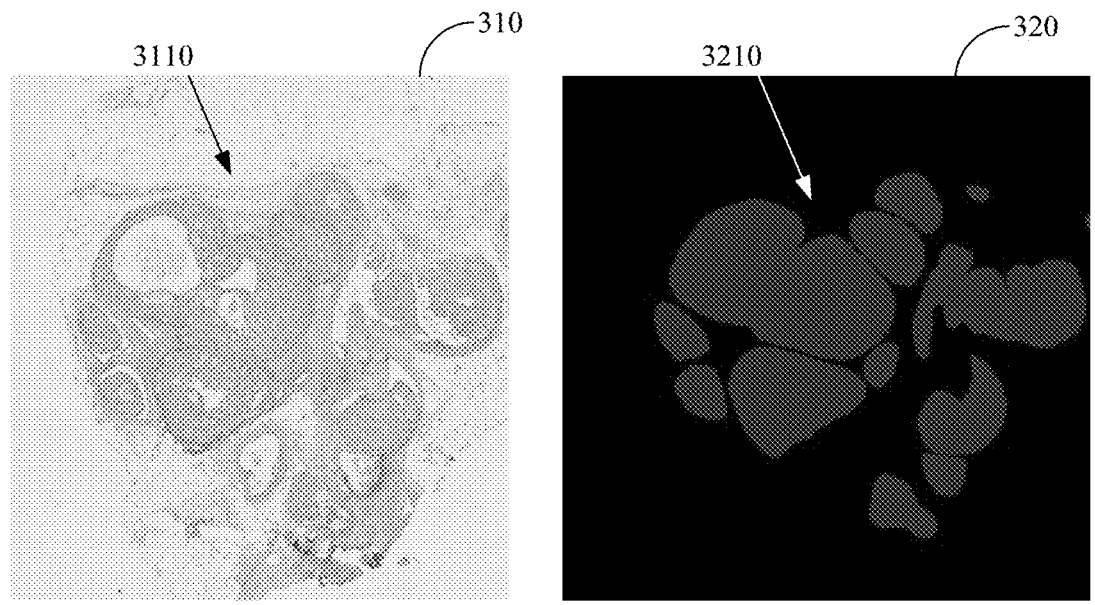
FIG. 3(a) is a diagram of an image at a scale according to an embodiment.
Figure 3B:
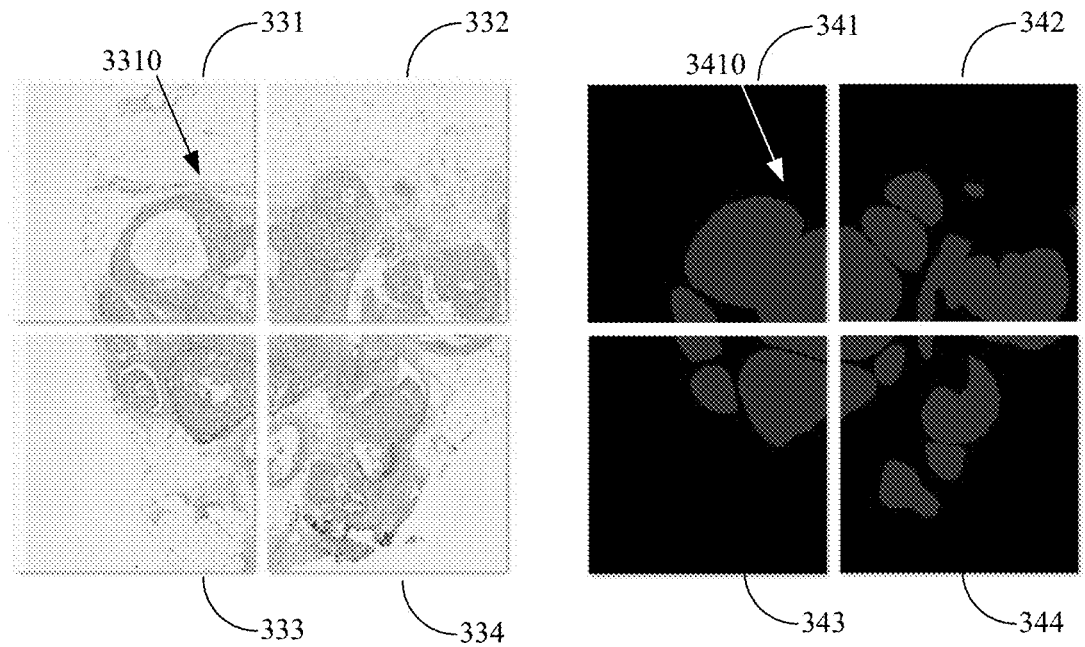
FIG. 3(b) is a diagram of an image at another scale according to an embodiment.

FIG. 3(a) is a diagram of an image at a scale according to an embodiment. FIG. 3(b) is a diagram of an image at another scale according to an embodiment. Referring to FIG. 3(a) and FIG. 3(b), a first example image 310 of the mammary duct acquired by the image processing device 100 under a 5× magnification is shown in FIG. 3(a). Third example images 331, 332, 333, and 334 of the mammary duct obtained under a 20× magnification are shown in FIG. 3(b). Any one of the third example images 331 to 334 may be used as an image of the mammary duct obtained under a 20× magnification. A first example arrow 3110 and a third example arrow 3310 illustrate positions of the mammary duct in the first example image 310 and the third example images 331 to 334, respectively. In view of this, the third example images 331 to 334 may be concatenated to obtain an image whose image size is the same as that of the first example image 310, and resolutions of the third example images 331 to 334 are higher than that of the first example image 310, that is, an image resolution of an image corresponding to a larger field of view needs to be lower than an image resolution of an image corresponding to a smaller field of view.

In addition, the image processing device 100 may further label the to-be-classified object in the image of each scale. For example, the to-be-classified object in the image of each scale may be labeled in a binarization or multivalued manner. As shown in FIG. 3(a), a second example image 320 is a binarized labeled image corresponding to the first example image 310, and a second example arrow 3210 shows a binarized labeled result of the mammary duct under a 5× magnification. As shown in FIG. 3(b), fourth example images 341, 342, 343, and 344 are binarized labeled images corresponding to the third example images 331 to 334, and a second example arrow 3410 shows a binarized labeled result for the mammary duct under a 20× magnification. In a binarized labeling manner, the image processing device 100 may segment a to-be-classified object in an image of a corresponding scale from a background, such that the to-be-classified object obtained by means of segmentation is subsequently classified. In addition to binarization, a multivalued labeling manner may also be used for segmenting the to-be-classified object from the background. For example, the multivalued labeling manner may be specifically to label the to-be-classified objects as different colors according to different sizes of the to-be-classified objects, such that a size range to which the to-be-classified object belongs is subsequently determined according to a color of the to-be-classified object.

In operation S203, the system uses as a to-be-classified image of the to-be-classified object, an image whose image size matches (or corresponds to) a size of the to-be-classified object in the images of the to-be-classified object in the at least two scales.

This operation may include the following: The image processing device 100 selects, according to the size of the to-be-classified object, an image that matches the size of the to-be-classified object as the to-be-classified image, such that classification processing is performed on the to-be-classified object whose size matches the to-be-classified image based on the to-be-classified object in subsequent steps. For example, an image of 1024×1024 pixels under a 5× magnification and an image of 2048×2048 pixels under a 20× magnification are used as images in two scales. It is assumed that to-be-classified objects include a large duct and a small duct. For definitions of the large duct and the small duct, reference may be made to the foregoing description. That is, the image processing device 100 may mark, as a large duct, a mammary duct that occupies 2048 pixels or more under a 20× magnification, and mark, as a small duct, a mammary duct that occupies less than 2048 pixels under a 20× magnification. In this case, the image processing device 100 uses an image of 1024×1024 pixels under a 5× magnification as an image that matches a size of a large duct in the mammary duct, and uses an image of 2048×2048 pixels under a 20× magnification as an image that matches a size of a small duct in the mammary duct.

Herein, the term "match" is used to refer to determining an image that is appropriate for classification of the object based on a size of the object, and does not mean that there is an exact matching relationship between the image size of the image and the size of the object to be classified. For example, for selection of an image that matches (or corresponds to) a size of a small duct in the mammary duct, because an image size of an image of 1024×1024 pixels under a 5× magnification is also larger than the size of the small duct, an image of 1024×1024 pixels under a 5× magnification can also be applied to perform classification processing on the small duct. However, the image of 2048×2048 pixels under a 20× magnification also meets the size matching condition, and the image of 2048×2048 pixels under a 20× magnification has a higher resolution than that of the image of 1024×1024 pixels under a 5× magnification, such that a small duct-related feature can be more clearly acquired, which facilitates classification. Therefore, the image processing device 100 classifies the image of 2048×2048 pixels under a 20× magnification as an image that matches the size of the small duct for classification processing.

In operation S204, the system classifies the to-be-classified object in the to-be-classified image based on a classification model corresponding to an image resolution of the to-be-classified image, to obtain a classification result of a to-be-classified object of each size.

In this operation, the image processing device 100 may preconfigure multiple classification models for the to-be-classified object, and the multiple classification models may correspond to different image resolutions. Therefore, after obtaining the to-be-classified image, the image processing device 100 may select a corresponding classification model according to the image resolution of the to-be-classified image, and then the image processing device 100 inputs the to-be-classified image into the classification model. The classification model may classify the to-be-classified object in the to-be-classified image, and obtain and output a corresponding classification result. Because different to-be-classified images are matched with to-be-classified objects of different sizes, that is, to-be-classified objects of different sizes may be classified by using corresponding classification models in to-be-classified images of different sizes, such that the image processing device 100 may obtain a classification result outputted by each classification model, so as to obtain the classification result of to-be-classified object of each size.

In this operation, the image processing device 100 selects the corresponding classification model with reference to the image resolution of the to-be-classified image, to classify the to-be-classified object on the to-be-classified image. For a small-sized to-be-classified image, its image resolution is relatively high, and local features of the to-be-classified object are easily extracted, which is more conducive to accurate classification. Therefore, the to-be-classified object may be classified by using a local feature classification model. For a large-sized to-be-classified image, its image resolution is relatively low, and the to-be-classified image may be classified by using an overall feature such as a contour size of the to-be-classified object on the image. For example, the to-be-classified image may be classified by using an image semantic classification model.

Figure 4:
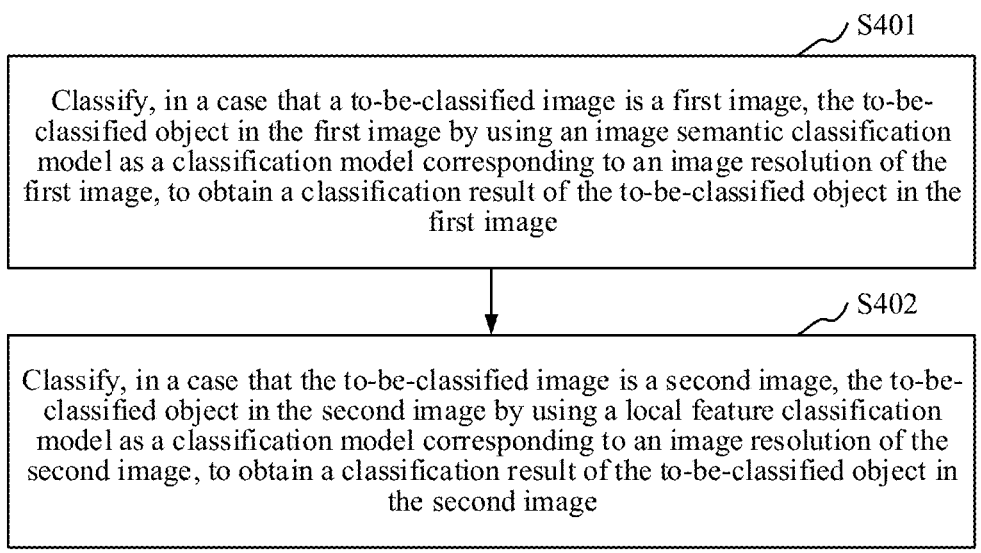
FIG. 4 is a flowchart of a step of acquiring a classification result of a to-be-classified object of each size according to an embodiment.

FIG. 4 is a flowchart of a step of acquiring a classification result of a to-be-classified object of each size according to an embodiment. For example, the images of the to-be-classified object in the at least two scales may include a first image corresponding to a first scale and a second image corresponding to a second scale, and the first scale is less than the second scale. As shown in FIG. 4, FIG. 4 is a schematic flowchart of a step of acquiring a classification result of the to-be-classified object of each size according to an embodiment. Operation S204 of classifying the to-be-classified object in the to-be-classified image based on a classification model corresponding to an image resolution of the to-be-classified image, to obtain a classification result of a to-be-classified object of each size may specifically include the following operations:

In operation S401, the system classifies in a case that the to-be-classified image is the first image, the to-be-classified object in the first image by using an image semantic classification model as a classification model corresponding to an image resolution of the first image, to obtain a classification result of the to-be-classified object in the first image.

In operation S402, the system classifies in a case that the to-be-classified image is the second image, the to-be-classified object in the second image by using a local feature classification model as a classification model corresponding to an image resolution of the second image, to obtain a classification result of the to-be-classified object in the second image.

In this embodiment, when the size of the to-be-classified object matches the image size of the first image, the image processing device 100 identifies the to-be-classified object on the first image, that is, the to-be-classified image is the first image. When the size of the to-be-classified object matches the image size of the second image, the image processing device 100 identifies the to-be-classified object on the second image, that is, the to-be-classified image is the second image. The first scale of the first image is less than the second scale of the second image. Therefore, an image resolution of the first image is less than an image resolution of the second image. For the first image with a relatively small image resolution, the image processing device 100 classifies the to-be-classified object on the first image by using an image semantic classification model as a classification model of the first image. The image semantic classification model may classify the to-be-classified object based on an overall contour feature of the to-be-classified object on the first image, and the image semantic classification model may implement a semantic network segmentation model based on a network model such as fully convolutional (FC)-DenseNet (FC-DenseNet). For the second image with a relatively large image resolution, the image processing device 100 may classify the to-be-classified object on the second image by using a local feature classification model as a classification model of the second image. The local feature classification model may segment each local feature of the to-be-classified object, and each local feature of the to-be-classified object is extracted, so as to implement classification of the to-be-classified object.

The large and small ducts in the mammary duct are used as an example for a specific description in this embodiment. The image processing device 100 may use an image of 1024×1024 pixels under a 5× magnification as the first image, and use an image of 2048×2048 pixels under a 20× magnification as the second image. For the first image, the image processing device 100 may perform semantic classification on the large duct based on a FC-DenseNet network model and multiple types of labels, and acquire a classification result according to a corresponding category label. For the second image, the image processing device 100 may segment a cell of the small duct in the second image, and then perform cell feature extraction to obtain a classification result of the small duct.

In the foregoing solution provided in this embodiment, the image processing device 100 may accurately classify a to-be-classified object in a corresponding to-be-classified image by using a classification model corresponding to an image resolution, and obtain classification results of to-be-classified objects of various sizes, thereby improving classification efficiency.

In operation S205, the system fuses the classification result of the to-be-classified object of each size to obtain classification results of the to-be-classified objects of the at least two sizes in the digital slide.

In this operation, the image processing device 100 fuses to-be-classified results of all sizes, so as to obtain classification results of the to-be-classified objects of all sizes in the digital slide. Using the mammary duct as an example, the mammary duct may include a large duct and a small duct. The image processing device 100 may classify the large duct and the small duct in different to-be-classified images and finally, fuse classification results of the large duct and the small duct to obtain classification results of mammary ducts of various sizes in the digital slide.

In the foregoing image processing method, the image processing device 100 acquires a digital slide that includes to-be-classified objects of at least two sizes; and acquires images of the to-be-classified object in at least two scales according to the digital slide, an image of a larger scale having a smaller image size and a higher image resolution than an image of a smaller scale. Then, the image processing device 100 uses, as the to-be-classified image of the to-be-classified object, an image whose image size matches the size of the to-be-classified object in the images of the to-be-classified object in the at least two scales. In this way, the image processing device 100 may adaptively select the to-be-classified image according to the actual size of the to-be-classified object, and classifies the to-be-classified object of the to-be-classified image by using a classification model corresponding to the image resolution of the to-be-classified image. Finally, the image processing device 100 fuses the classification result of the to-be-classified object of each size, so as to achieve a precise classification effect of the to-be-classified object of each size included in the digital slide, thereby improving accuracy of classifying the to-be-classified object of the digital slide.

Figure 5:
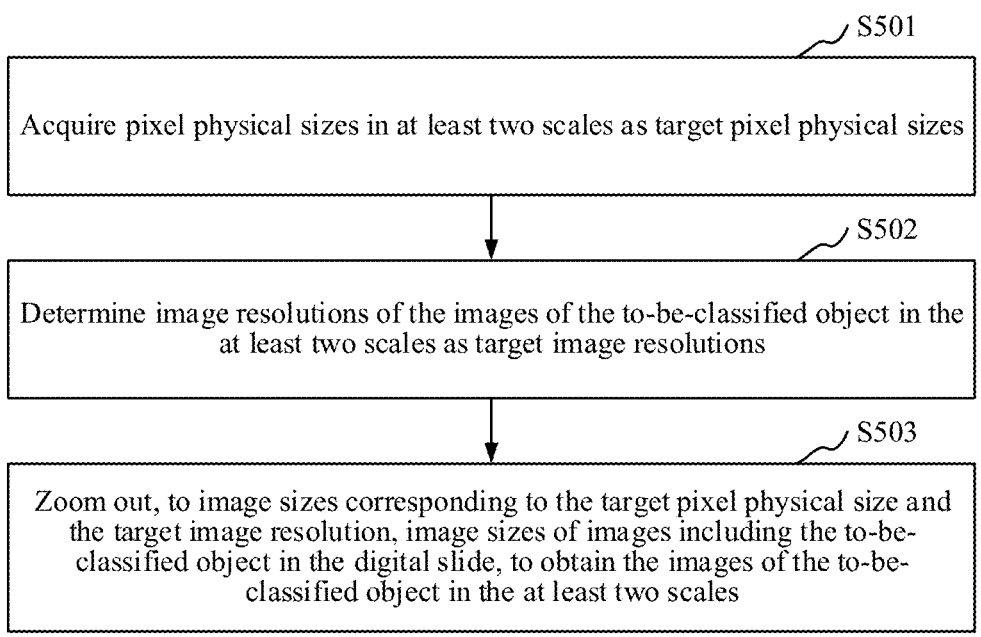
FIG. 5 is a flowchart of a step of acquiring images of a to-be-classified object in at least two scales according to an embodiment.

FIG. 5 is a flowchart of a step of acquiring images of a to-be-classified object in at least two scales according to an embodiment. In an embodiment, as shown in FIG. 5, FIG. 5 is a schematic flowchart of a step of acquiring images of a to-be-classified object in at least two scales according to an embodiment. Step S202 of acquiring images of the to-be-classified object in at least two scales according to the digital slide may be implemented in the following manner:

In operation S501, the system acquires pixel physical sizes in the at least two scales as target pixel physical sizes.

In operation S502, the system determines image resolutions of the images of the to-be-classified object in the at least two scales as target image resolutions.

In operation S503, the system zooms out, to image sizes corresponding to the target pixel physical size and the target image resolution, image sizes of images including the to-be-classified object in the digital slide, to obtain the images of the to-be-classified object in the at least two scales.

Because a to-be-classified object in an image has an actual physical size, pixels of each image in different scales need to correspond to the same physical size, such that segmentation and classification can be correctly implemented. Based on this, in this embodiment, the image processing device 100 may zoom out, according to pixel physical sizes and image resolutions that are corresponding to different scales, an image size of an image that is in the digital slide and that includes a to-be-classified object, to obtain images of the to-be-classified object in at least two scales, and a size of the to-be-classified object in the image of each scale is consistent, thereby improving classification accuracy of the to-be-classified object.

Specifically, the image processing device 100 may acquire pixel physical sizes corresponding to the foregoing at least two scales as target pixel physical sizes, and read image resolutions required for the images of the to-be-classified object in the at least two scales as target image resolutions. According to the target pixel physical sizes and the target image resolutions, the image processing device 100 may select, from the digital slide, an image that includes the to-be-classified object, and zoom out an image size of the image that includes the to-be-classified object in the digital slide to image sizes corresponding to the target pixel physical sizes and the target image resolutions, to obtain the images of the to-be-classified object in the at least two scales.

In some embodiments, before the image size of the image that includes the to-be-classified object in the digital slide is zoomed out to the image sizes corresponding to the target pixel physical sizes and the target image resolutions to obtain the images of the to-be-classified object in the at least two scales, the image processing device 100 may further determine, in the following manner, the image size of the image that includes the to-be-classified object in the digital slide. A specific operation may include acquiring an original pixel physical size of the digital slide, and determining, according to the original pixel physical size, the target image resolution, and the target pixel physical size, the image size of the image that includes the to-be-classified object in the digital slide.

A pixel size of a maximum original image of the digital slide is generally different. This generally depends on different image scanning devices. In this embodiment, the solution may implement digital slides of different pixel sizes, and output images in different scales in which actual physical sizes of the to-be-classified object are consistent.

Specifically, the image processing device 100 may read the pixel size of the maximum original image (for example, a digital slide scanned under a 40× magnification) of the digital slide as an original pixel physical size. Then, after obtaining the target image resolution and the target pixel physical size, the image processing device 100 may calculate, according to the original pixel physical size, the target image resolution, and the target pixel physical size, an image size of an image that includes the to-be-classified object in the corresponding digital slide.

In an embodiment, the determining, according to the original pixel physical size, the target image resolution, and the target pixel physical size, the image sizes of the images including the to-be-classified object in the digital slide may include a specific operation of acquiring a pixel physical size ratio; and determining, according to the target image resolution and the pixel physical size ratio, the image sizes of the images including the to-be-classified object in the digital slide.

The pixel physical size ratio refers to a ratio of the target pixel physical size to the original pixel physical size. In this embodiment, the image processing device 100 may specifically determine the image size of the image that includes the to-be-classified object in the digital slide according to a product of the target image resolution and the pixel physical size ratio.

Shapes of the image and the pixel each are generally a rectangle, that is, an image size has an image horizontal size and an image vertical size, and a pixel physical size has a pixel horizontal physical size and a pixel vertical physical size. Therefore, the target pixel physical size ratio may include a pixel horizontal physical size ratio and a pixel vertical physical size ratio. The target pixel physical size may include a target pixel horizontal physical size and a target pixel vertical physical size. The original pixel physical size may include an original pixel horizontal physical size and an original pixel vertical physical size. The target image resolution may include a target image horizontal resolution and a target image vertical resolution.

Based on this, in some embodiments, the foregoing operation of obtaining a pixel physical size ratio may include using a ratio of a target pixel horizontal physical size to an original pixel horizontal physical size as a pixel horizontal physical size ratio, and using a ratio of a target pixel vertical physical size to an original pixel vertical physical size as a pixel vertical physical size ratio.

In this embodiment, the image processing device 100 may first determine the target pixel horizontal physical size and the target pixel vertical physical size, and the original pixel horizontal physical size and the pixel vertical physical size ratio. Then, the image processing device 100 may calculate a ratio of the target pixel horizontal physical size to the original pixel horizontal physical size to obtain the pixel horizontal physical size ratio. The image processing device 100 may further calculate a ratio of the target pixel vertical physical size to the original pixel vertical physical size, to obtain the pixel vertical physical size ratio.

In some embodiments, the operation of determining, according to the target image resolution and the pixel physical size ratio, the image sizes of the images including the to-be-classified object in the digital slide may include determining, according to the target image resolution and the pixel physical size ratio, the image sizes of the images including the to-be-classified object in the digital slide, and using a product of a target image horizontal resolution and a pixel horizontal physical size ratio as an image horizontal size of the image including the to-be-classified object in the digital slide, and using a product of a target image vertical resolution and a pixel vertical physical size ratio as an image vertical size of the image including the to-be-classified object in the digital slide.

Specifically, the image processing device 100 may first determine the target image horizontal resolution and the target image vertical resolution. Then, the image processing device 100 multiplies the target image horizontal resolution by the pixel horizontal physical size ratio to obtain an image horizontal size of an image that includes the to-be-classified object in the digital slide. The image processing device 100 may further multiply the target image vertical resolution by the pixel vertical physical size ratio to obtain an image vertical size of the image that includes the to-be-classified object in the digital slide. In this way, the image processing device 100 may obtain the image size of the image that includes the to-be-classified object in the digital slide according to the image horizontal size and the image vertical size.

The following describes in detail, by using a specific example, a manner of acquiring the image size of the image that includes the to-be-classified object in the digital slide.

First, the image processing device 100 reads a pixel size of a maximum original image of the digital slide, where the pixel size includes pixelsize_x and pixelsize_y, and represents physical sizes of the pixel in a horizontal direction and a vertical direction, respectively. Generally, a pixel size (including pixelsize_x and pixelsize_y) of a digital slide image scanned under a 40× magnification is about 0.25 micron. Similarly, a pixel size of a digital slide image scanned under a 20× magnification is about 0.5 micron. Based on this, for example, a vertical resolution of an image corresponding to a scale needs to be M pixels, and a horizontal resolution thereof needs to be N pixels. In addition, it is expected that a vertical physical size and a horizontal physical size of the pixel of the image are H and W micrometers respectively. In this way, on a digital slide, a calculation manner of an image size of an image that includes a to-be-classified object and that needs to be read is: image vertical size h_wsi of an image that needs to be cut h_wsi=M×H/pixelsize_y; image horizontal size w_wsi of the image that needs to be cut w_wsi=N×W/pixelsize_x. In a specific implementation, the image processing device 100 may acquire, from image data of the digital slide by using the OpenSlide tool package of Python, an image whose region is h_wsi×w_wsi in a maximum scale image (that is, an image whose Level=0), and then zoom out the image to a size of M×N pixels, so as to obtain an image corresponding to a certain scale.

For example, if it is assumed that an image of 1024×1024 under a 5× magnification is required, the image processing device 100 may read H=2 microns, W=2 microns, M=1024, and N=1024. If a maximum scale image of the digital slide is an image scanned under a 40× magnification, that is, a pixel physical size of the digital slide is about 0.25 micron, an image region size obtained by the image processing device 100 from the digital slide needs to be w_wsi=h_wsi=1024×2/0.25=8192 pixels. Then, the image processing device 100 zooms out an image that includes a to-be-classified object and whose size is 8192×8192 pixels to an image whose size is 1024×1024 pixels, to obtain an image of 1024×1024 pixels under a 5× magnification. Similarly, if the maximum scale image of the digital slide is an image scanned under a 20× magnification, the image processing device 100 acquires a region of 4096×4096 pixels from the digital slide, and zooms out the region to an image of a size of 1024×1024 pixels.

In some embodiments, the images of the to-be-classified object in the at least two scales may include a first image corresponding to a first scale and a second image corresponding to a second scale, and the first scale is less than the second scale. Operation S203 of using, as a to-be-classified image of the to-be-classified object, an image whose image size matches a size of the to-be-classified object in the images of the to-be-classified object in the at least two scales may specifically include using the first image whose image size is greater than a size of the to-be-classified object as the to-be-classified image of the to-be-classified object, in a case that the size of the to-be-classified object is greater than an image size of the second image.

In this embodiment, the image processing device 100 may first acquire the size of the to-be-classified object, and then compare the size of the to-be-classified object with the image size of the second image. If the size of the to-be-classified object is greater than the image size of the second image, it indicates that the to-be-classified object is not completely included in the second image. Therefore, the image processing device 100 cannot accurately classify the to-be-classified object. In this case, the image processing device 100 may classify the to-be-classified object in the first image whose image size is greater than the size of the to-be-classified object, thereby improving classification accuracy. In addition, when the image processing device 100 determines that the size of the to-be-classified object is less than the image size of the second image, because the second image has a larger image resolution than that of the first image, the image processing device 100 may classify the to-be-classified object in the second image, so as to improve classification accuracy.

Further, before the using the first image whose image size is greater than a size of the to-be-classified object as the to-be-classified image of the to-be-classified object, in a case that the size of the to-be-classified object is greater than an image size of the second image, the following operation may further be used for acquiring the size of the to-be-classified object, which may specifically include acquiring a contour feature of the to-be-classified object; and acquiring the size of the to-be-classified object according to the contour feature.

Before classifying a to-be-classified object in a current image, the image processing device 100 may acquire a contour feature of the to-be-classified object in the image, and determine a size of the to-be-classified object according to the contour feature. The contour feature may include contour point coordinates of the to-be-classified object in the image, such that the image processing device 100 may calculate the size of the to-be-classified object according to the contour point coordinates.

Specifically, the images of the to-be-classified object in the at least two scales may include a first image corresponding to a first scale and a second image corresponding to a second scale, and the first scale is less than the second scale. Because the first image has a larger image size than that of the second image, and the first image can completely include the to-be-classified object, the image processing device 100 may acquire contour point coordinates of the to-be-classified object on the first image, and may acquire, according to the contour point coordinates, a size of a to-be-classified object such as a bounding rectangle formed by an external contour of the to-be-classified object. Because actual physical sizes corresponding to the to-be-classified object in images of various scales are the same, the size of the to-be-classified object determined on the first image may be applied to images of different scales for size comparison.

In an embodiment, the contour feature of the to-be-classified object may be acquired by using a pre-trained segmentation model for the to-be-classified object. The operation of acquiring the contour feature of the to-be-classified object may specifically include acquiring a segmentation result of the to-be-classified object on the first image by using a segmentation model corresponding to the first scale, and acquiring the contour feature according to the segmentation result.

In this embodiment, the image processing device 100 may segment a to-be-classified object in an image of a corresponding size by using segmentation models corresponding to different scales, and acquire a contour feature of the to-be-classified object according to a segmentation result. The segmentation model may be applied to images of different scales to segment a to-be-classified object from a background of an image, and different scales may be corresponding to different segmentation models. Therefore, the image processing device 100 may perform training in different scales in advance by using corresponding training data to obtain, in various scales, segmentation models that can recognize and segment the to-be-classified object.

Figure 6:
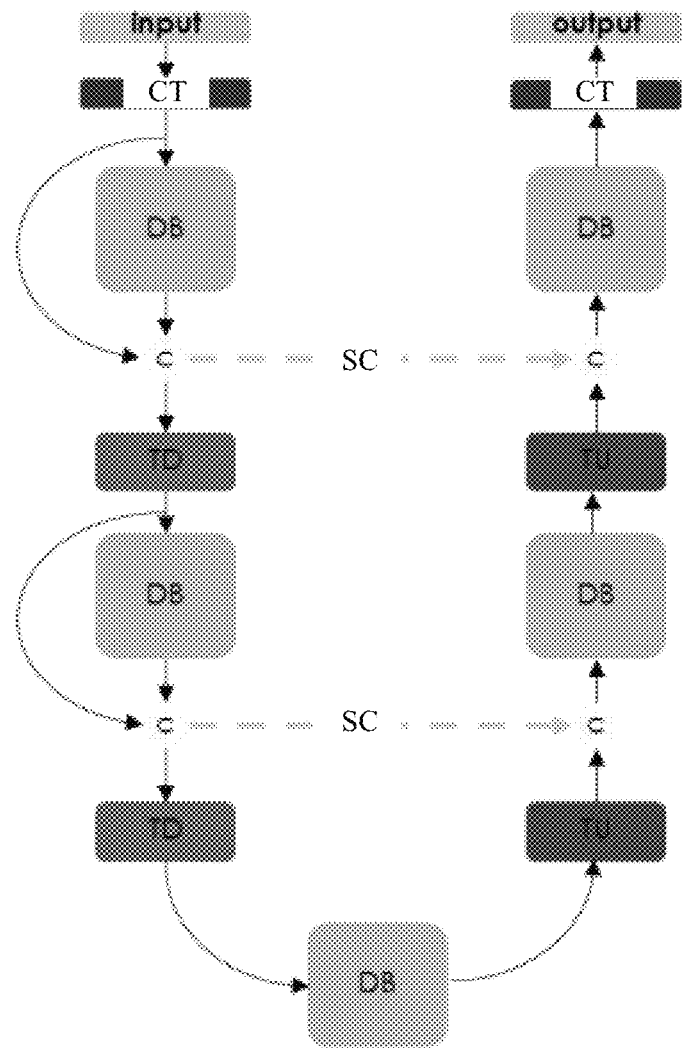
FIG. 6 is a diagram of a segmentation model according to an embodiment.

FIG. 6 is a diagram of a segmentation model according to an embodiment. In a specific embodiment, a network model of a fully convolutional dense connection network FC-DenseNet may be used for implementing a segmentation model of a to-be-classified object. A structure of the network model of the FC-DenseNet is shown in FIG. 6. DB represents Dense Block, that is, a dense module, C represents Convolution, TD represents Transitions Down, that is, downsampling, TU represents Transitions Up, that is, upsampling, CT represents concatenation, SC represents Skip Connection, Input represents an inputted image, and output represents an outputted segmentation classification result.

Specifically, the images of the to-be-classified object in the at least two scales may include a first image corresponding to a first scale and a second image corresponding to a second scale, and the first scale is less than the second scale. The image processing device 100 may train the network model of the FC-DenseNet based on the image data of the to-be-classified object in the images corresponding to the first scale and the second scale to obtain segmentation models corresponding to the first scale and the second scale, and may respectively obtain segmentation results of the to-be-classified object on the first image and the second image by using the segmentation models corresponding to the first scale and the second scale. A large duct and a small duct of a mammary duct are used as an example to describe a segmentation result.

Figure 7:
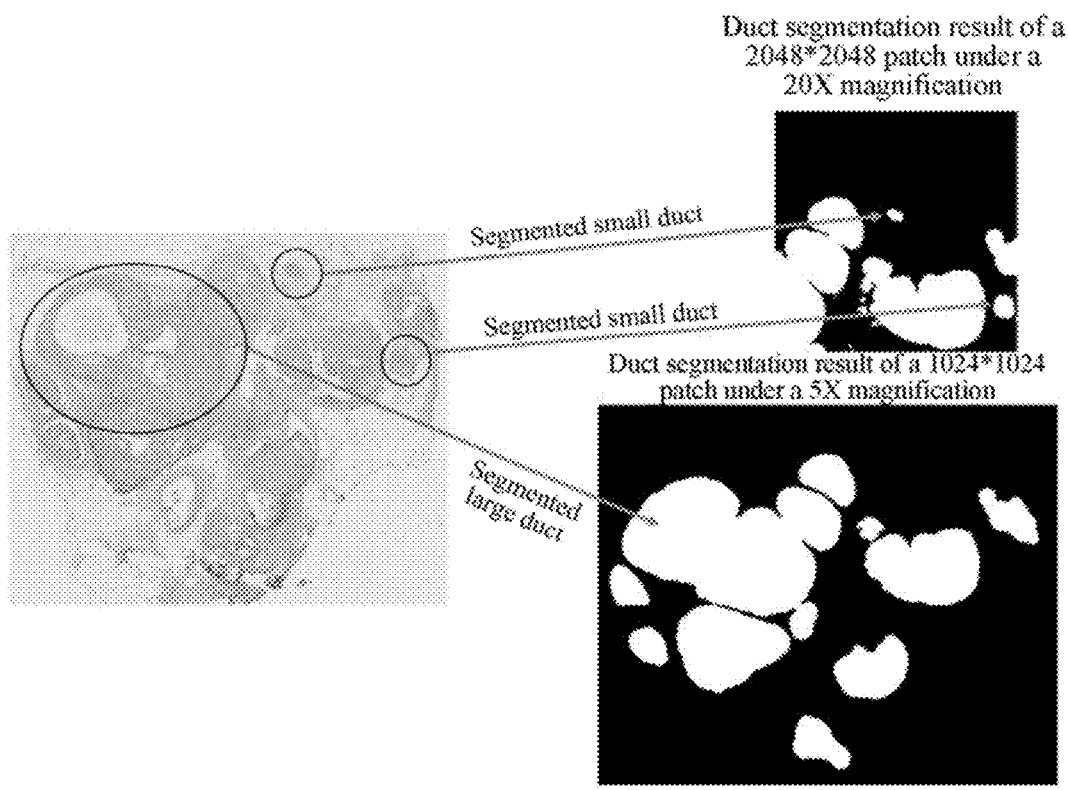
FIG. 7 is a diagram of a segmentation result according to an embodiment.

FIG. 7 is a diagram of a segmentation result according to an embodiment. FIG. 7 shows a duct segmentation result of a first image of 1024×1024 pixels under a 5× magnification and a duct segmentation result of a second image of 2048×2048 pixels under a 20× magnification. It can be learned that models using two scales may be used for relatively complementarily segmenting the large duct and the small duct, thereby improving segmentation efficiency and accuracy of the to-be-classified object.

In this embodiment, the image processing device 100 may acquire a segmentation result of the to-be-classified object on the first image by using a segmentation model corresponding to the first scale; and acquire the contour feature according to the segmentation result. The first image may completely include the to-be-classified image. Therefore, the to-be-classified object is segmented on the first image, and the contour feature of the to-be-classified object may be completely obtained.

In some embodiments, the operation of acquiring the size of the to-be-classified object according to the contour feature may specifically include acquiring, according to the contour feature, an image range occupied by the to-be-classified object in the first image, and using the image range occupied by the to-be-classified object in the first image as the size of the to-be-classified object.

In this embodiment, the image processing device 100 may acquire the contour feature of the to-be-classified object on the first image, where the contour feature may include external contour point coordinates of the to-be-classified object in the first image, such that the image processing feature 100 may determine, according to the external contour point coordinates, the image range occupied by the to-be-classified object in the first image, and use the image range as the size of the to-be-classified object.

Figure 8:
FIG. 8 is a diagram of an image range occupied by a to-be-classified object according to an embodiment.

FIG. 8 is a diagram of an image range occupied by a to-be-classified object according to an embodiment. The image range occupied by the to-be-classified object in the first image may include a horizontal image range and a vertical image range, and a bounding rectangle of an external contour of the to-be-classified object may be bound according to the horizontal image range and the vertical image range occupied by the to-be-classified object in the first image. Therefore, the image processing device 100 may use the size of the bounding rectangle as the size of the to-be-classified object.

Further, in some embodiments, whether the size of the to-be-classified object is greater than the image size of the second image may be determined according to the horizontal image range and the vertical image range that are occupied by the to-be-classified object in the first image. Before the using the first image whose image size is greater than a size of the to-be-classified object as the to-be-classified image of the to-be-classified object, in a case that the size of the to-be-classified object is greater than an image size of the second image, whether the size of the to-be-classified object is greater than the image size of the second image may be further determined by the following:

The image processing device 100 may determine that the size of the to-be-classified object is greater than the image size of the second image, in a case that a horizontal image range occupied by the to-be-classified object in the first image is greater than a horizontal image size of the second image, or in a case that a vertical image range occupied by the to-be-classified object in the first image is greater than a vertical image size of the second image.

In this embodiment, the image processing device 100 may use at least one of conditions that the horizontal image range occupied by the to-be-classified object in the first image is greater than the horizontal image size of the second image and that the vertical image range occupied by the to-be-classified object in the first image is greater than the vertical image size of the second image as a determining condition that the size of the to-be-classified object is greater than the image size of the second image. When determining that any one of the foregoing conditions is met, the image processing device 100 may determine that the size of the to-be-classified object is greater than the image size of the second image, thereby improving efficiency of matching the image size with the size of the to-be-classified object.

Figure 9:
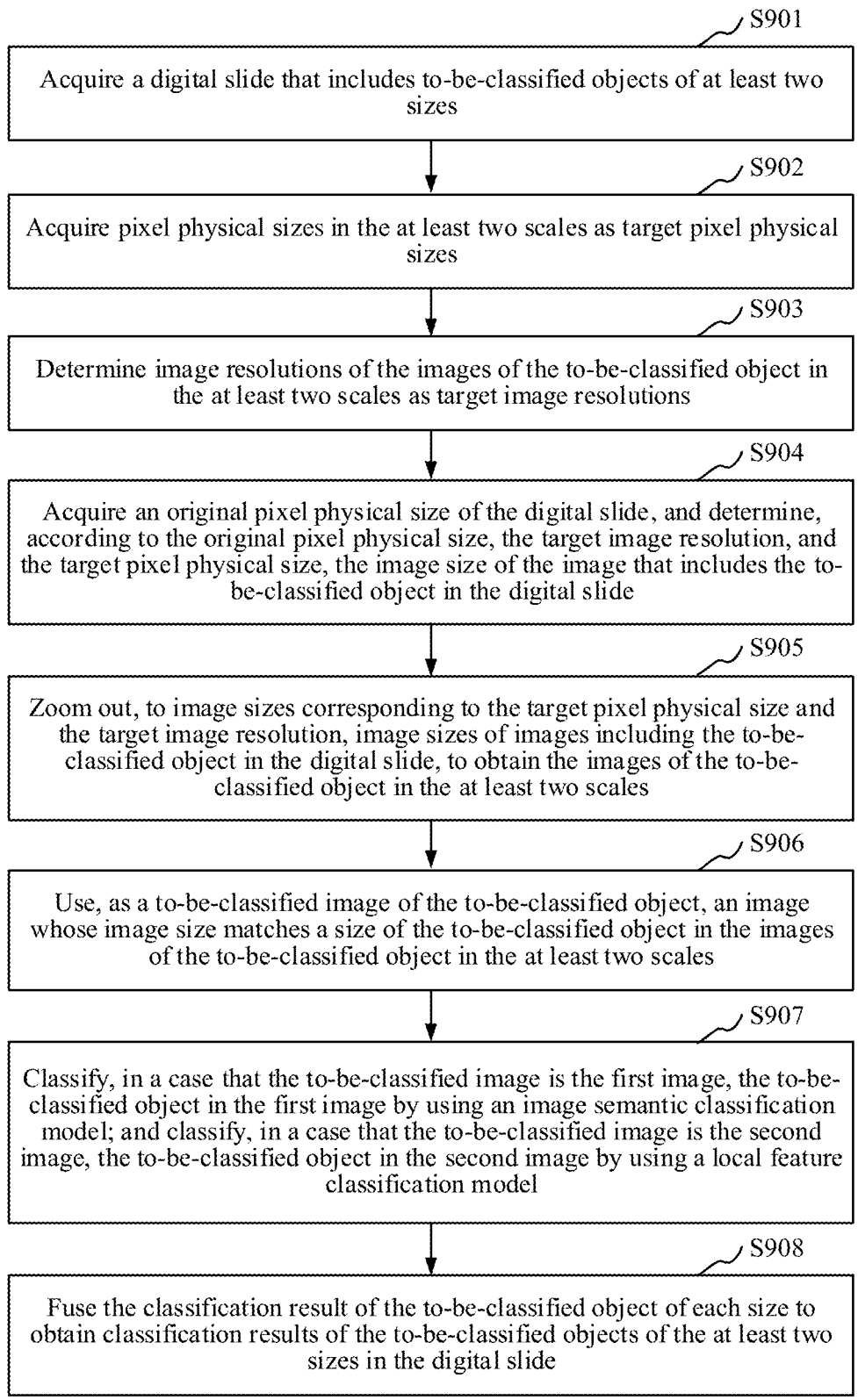
FIG. 9 is a flowchart of an image processing method according to an embodiment.

FIG. 9 is a flowchart of an image processing method according to an embodiment. In an embodiment, an image processing method is further provided. As shown in FIG. 9, the image processing method may be applied to the image processing device 100 shown in FIG. 1. The method specifically includes the following operations.

In operation S901 the image processing device 100 acquires a digital slide that includes to-be-classified objects of at least two sizes.

In operation S902, the image processing device 100 acquires pixel physical sizes in the at least two scales as target pixel physical sizes.

In operation S903, the image processing device 100 determines image resolutions of the images of the to-be-classified object in the at least two scales as target image resolutions.

In the images of the to-be-classified object in the at least two scales, an image of a larger scale has a smaller image size and a higher image resolution than an image of a smaller scale.

In operation S904, the image processing device 100 acquires an original pixel physical size of the digital slide, and determines, according to the original pixel physical size, the target image resolution, and the target pixel physical size, the image size of the image that includes the to-be-classified object in the digital slide.

In operation S905, the image processing device 100 zooms out, to image sizes corresponding to the target pixel physical size and the target image resolution, image sizes of images including the to-be-classified object in the digital slide, to obtain the images of the to-be-classified object in the at least two scales.

In operation S906, the image processing device 100 uses, as a to-be-classified image of the to-be-classified object, an image whose image size matches a size of the to-be-classified object in the images of the to-be-classified object in the at least two scales.

In operation S907, the image processing device 100 classifies, in a case that the to-be-classified image is the first image, the to-be-classified object in the first image by using an image semantic classification model, to obtain a classification result of the to-be-classified object of the corresponding size; and the image processing device 100 classifies, in a case that the to-be-classified image is the second image, the to-be-classified object in the second image by using a local feature classification model, to obtain a classification result of the to-be-classified object of the corresponding size.

The images of the to-be-classified object in the at least two scales may include a first image corresponding to a first scale and a second image corresponding to a second scale, and the first scale is less than the second scale.

In operation S908, the image processing device 100 fuses the classification result of the to-be-classified object of each size to obtain classification results of the to-be-classified objects of the at least two sizes in the digital slide.

In the foregoing image processing method, a to-be-classified image may be adaptively selected according to an actual size of a to-be-classified object, and in a corresponding to-be-classified image, to-be-classified objects of different sizes are classified simultaneously by using an image semantic classification model and a local feature classification model, and finally, classification results of to-be-classified objects of all sizes on a digital slide can be obtained by fusing classification results of the to-be-classified objects of all sizes, thereby achieving a technical effect of accurate classification.

It is to be understood that steps in the foregoing flowchart are displayed in sequence based on indication of arrows, but the steps are not necessarily performed in sequence based on a sequence indicated by the arrows. Unless clearly specified in this specification, there is no strict sequence limitation on the execution of the steps, and the steps may be performed in another sequence. Besides, at least some steps in the flowchart may include a plurality of sub-steps or a plurality of stages, the sub-steps or stages are not necessarily performed at a same moment and may be performed at different moments, the sub-steps or stages are not necessarily sequentially performed, and the sub-steps or stages and at least some of other steps or sub-steps or stages of other steps may be performed in turn or alternately.

Figure 10:
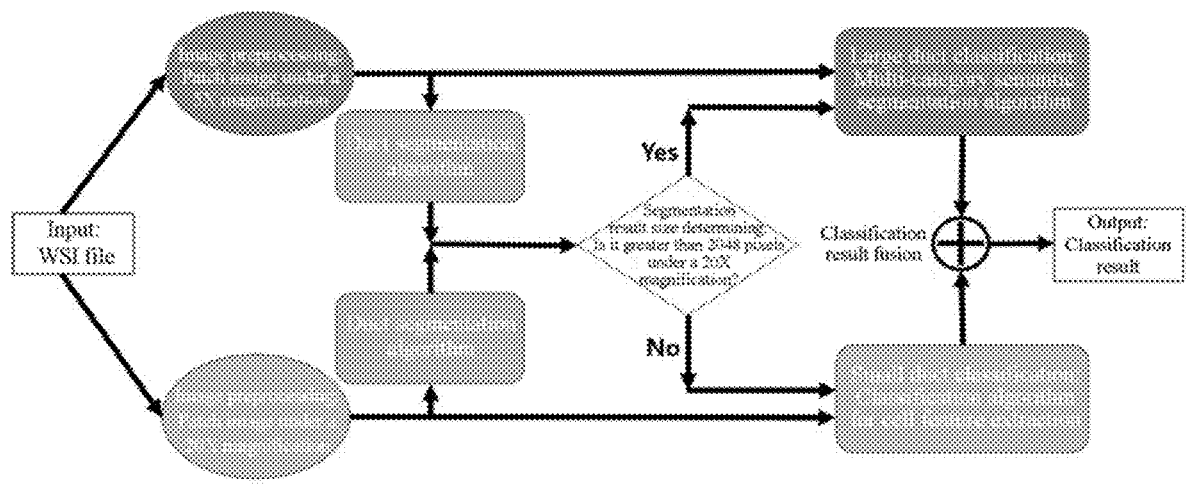
FIG. 10 is a flowchart of an image processing method according to an embodiment.

FIG. 10 is a flowchart of an image processing method according to an embodiment. The image processing method in this disclosure is applied to lesion classification on a large and small ducts of a mammary duct. Referring to FIG. 10, specific operations include the following operations:

Operation 1: Multi-scale data generation specifically includes: Input: WSI image file, image pixel size M×N of an image in a scale expected to be acquired, and pixel physical sizes H and W; and Output: patch image of the WSI and a corresponding labeled image In this operation, pixel lengths of maximum original images of the WSI image are generally different, and depends mainly on different WSI image scanning devices. However, a cell in an image has an actual physical length. Therefore, in this example, pixels of all images need to correspond to the same physical size to correctly implement segmentation and classification. Therefore, in this operation, WSIs for different pixel sizes may be further implemented by using the following operations, and images of various scales corresponding to a unified physical size is outputted. Specifically, first, a pixel length of a maximum original image of a WSI is read, including pixelsize_x and pixelsize_y, which are respectively physical lengths of the pixel in a horizontal direction and a vertical direction. For a WSI image scanned under a 40× magnification, its pixel size is about 0.25 micron, and for a WSI image scanned under a 20× magnification, its pixel size is about 0.5 micron.

For example, an image size of an image in a scale that needs to be outputted has a height of M pixels and a width of N pixels. In addition, it is expected that a physical height and width of a pixel of the image in this scale are H and W micrometers respectively. A calculation manner of a pixel length and width occupied by an image that needs to be cut on an original WSI image is as follows:

The pixel height h_wsi of the image that needs to be cut is h_wsi=M×H/pixelsize_y; the pixel width w_wsi of the image that needs to be cut is w_wsi=N×W/pixelsize_x. By using the OpenSlide toolkit of Python, an image whose region is h_wsi×w_wsi on a maximum scale image (that is, an image of Level=0) may be obtained from the image data of the WSI, and then the image is zoomed out to a size of M×N pixels, so as to acquire the pixel length and width of the cut image.

For example, when an image of 1024×1024 under a 5× magnification is required, H=2 microns, W=2 microns, M=1024, and N=1024 are inputted. If a maximum scale image of the WSI is an image scanned under a 40× magnification, that is, pixelsize_x is approximately equal to 0.25 micron, an image region obtained on the WSI needs to be w_wsi=h_wsi=1024×2/0.25=8192 pixels. Finally, an image of 8192×8192 is zoomed out to an image of a size of 1024×1024 pixels. Similarly, if a maximum scale image of the WSI is an image scanned under a 20× magnification, a region of 4096×4096 pixels is acquired from the original image, and zoomed out to an image of a size of 1024×1024 pixels.

By using the foregoing operations, two groups of images of different scales are obtained.

A first group of 1024×1024 pixel-sized images under a 5× magnification (i.e., H=W=2 microns) can be used for segmentation in large ducts and image-based lesion classification.

A second group of 2048×2048 pixel-sized images under a 20× magnification (i.e., H=W=0.5 micron) can be used for segmentation in smaller ducts and cell-based lesion classification.

Herein, 2048×2048 under a 20× magnification in the second group of data is equivalent to a 512 pixel-sized image under a 5× magnification, and it can be learned that a visual field of the second group of data is a quarter of that of the first group of data. Therefore, some large ducts may exceed a size of an image, thereby increasing recognition difficulty. This is also a reason for using the first group of scale data. However, clarity of the second group of data is twice that of the first group of data, and therefore is more suitable for fine segmentation of a smaller duct and a cell region.

A schematic diagram of acquiring an image corresponding to each scale from an original image of the WSI is as follows: For an image of the WSI in each scale, a labeled image of an image region in which a mammary duct is located is correspondingly acquired, and a multivalued or binarized mask image is generated according to a deep learning training requirement. FIG. 3(a) and FIG. 3(b) respectively show images that include a to-be-classified object and a corresponding labeled image in two scales cut out from the image file of the WSI. FIG. 3(a) is corresponding to a size of 1024 pixels under a 5× magnification, and FIG. 3(b) is corresponding to a size of 2048 pixels under a 20× magnification.

Operation 2: Duct segmentation: Input: Include an image of a mammary duct and a binarized labeled image of the mammary duct; and Output: Binarized image of a mammary duct contour.

In this operation, training of two segmentation models may be performed based on the data in operation 1. Segmentation model 1: Use a first group of 1024×1024 image data under a 5× magnification to segment a large duct. Segmentation model 2: Use a second group of 2048×2048 image data under a 20× magnification, to perform fine segmentation for a small duct. A segmentation network may implement a duct segmentation model by using a fully convolutional dense connection network FC-DenseNet. In this method, a dense block is used for replacing a convolutional (Cony) block in a conventional U-net. The advantage of the FC-DenseNet is that a parameter quantity is relatively low, such that theoretically generalization is relatively good, and a better result can be obtained than an encoder-decoder structure. For a specific structure of the model, refer to FIG. 6.

FIG. 7 shows segmentation results obtained by using the foregoing two segmentation models, where the segmentation models of two scales are relatively complementary to each other to segment both a large duct and a small duct.

Operation 3: Determine a duct area. Input: Duct segmentation results in operation 2; and Output: Duct size determining result.

As shown in FIG. 8, based on operation 2, a maximum length range and a maximum width range of pixels of a single duct may be calculated. Further, pixel coordinates of a duct of a current image (a 1024×1024 image under a 5× magnification or a 2048×2048 image under a 20× magnification) may be converted into pixel coordinates under a 20× magnification, and then it is determined whether a current duct range is greater than 2048 pixels. Because images under various magnifications are allowed to be acquired in a classification processing process, a duct of 2048 pixels under a 20× magnification needs to be defined as a large duct herein, and conversion is required first to determine whether a duct is a large duct.

Operation 4: Input: Size determining result of a large duct and images of various mammary ducts included in an WSI image; and Output: Determining of a duct type.

In this operation, a large duct may be first processed, that is, a FC-DenseNet network model is used and a multi-category label is used for training data to obtain a multi-category segmentation model, so as to further obtain a segmentation result. In the segmentation result, a result of the large duct is retained as a classification result of the large duct.

Figure 11:
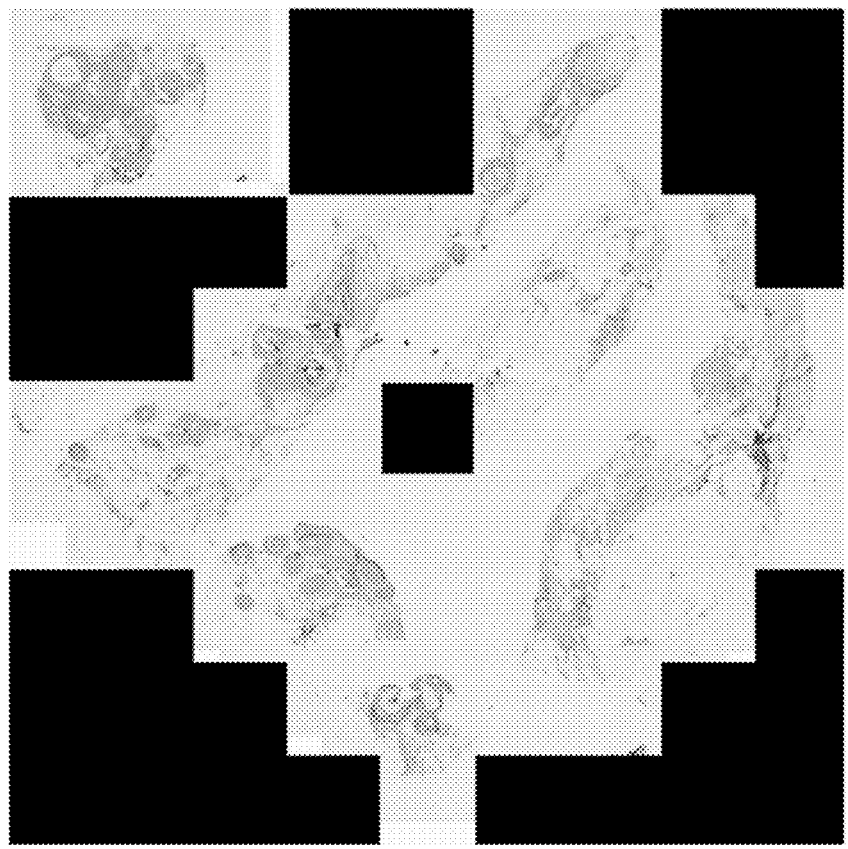
FIG. 11 is a diagram of a digital slide according to an embodiment.
Figure 12:
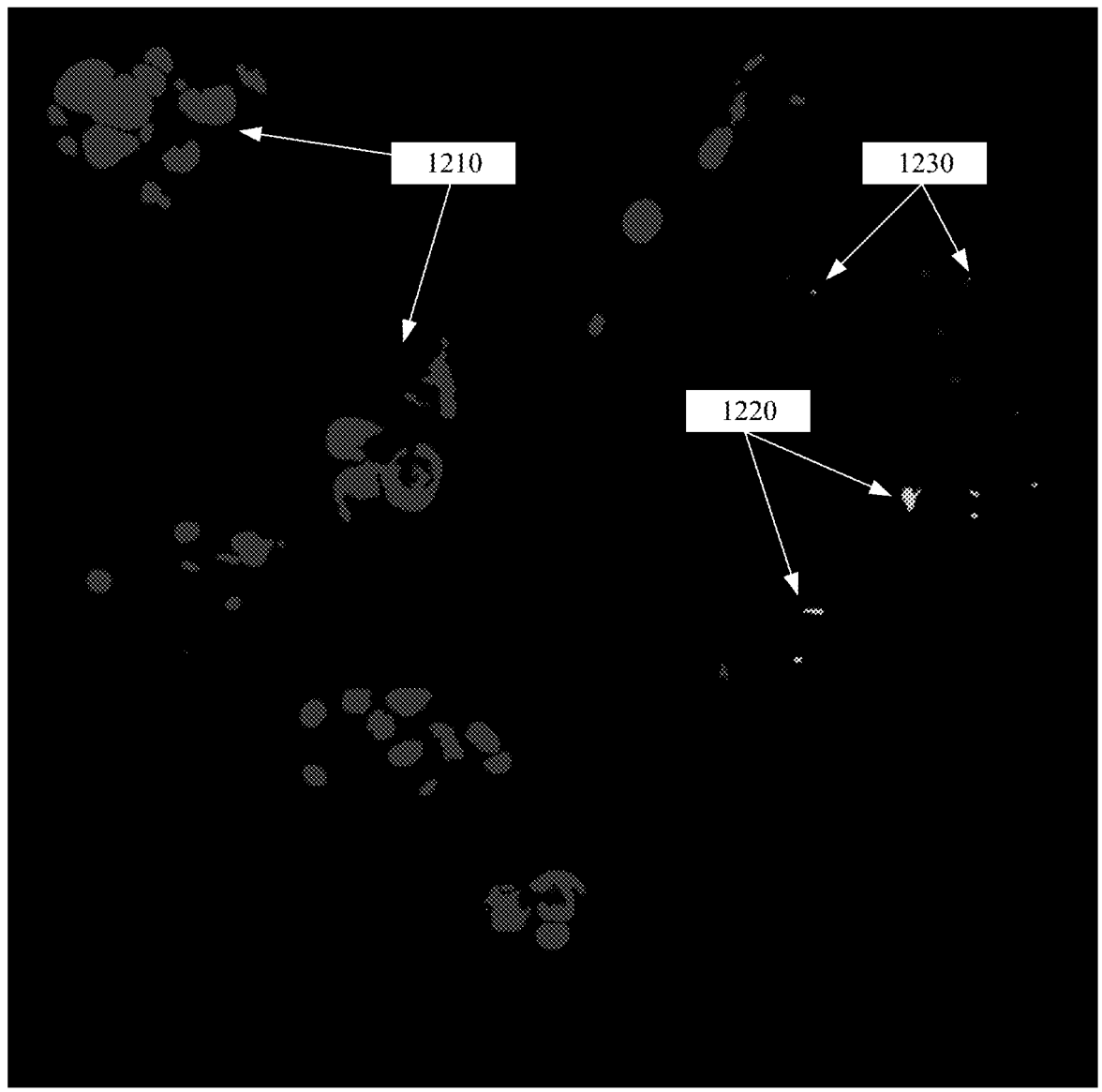
FIG. 12 is a diagram of a multi-category segmentation result according to an embodiment.

FIG. 11 is a diagram of a digital slide according to an embodiment. FIG. 12 is a diagram of a multi-category segmentation result according to an embodiment. A complete WSI image is shown in FIG. 11. The WSI image is an image formed after individual images that include a mammary duct are concatenated. For ease of viewing a result, FIG. 12 shows a multi-category segmentation result based on the FC-DenseNet network model, including a large duct and a small duct. The figure shows a prediction result, including a carcinoma in situ duct 1210, a normal duct 1220, and a usual ductal hyperplasia duct 1230 (UDH).

Figure 13:
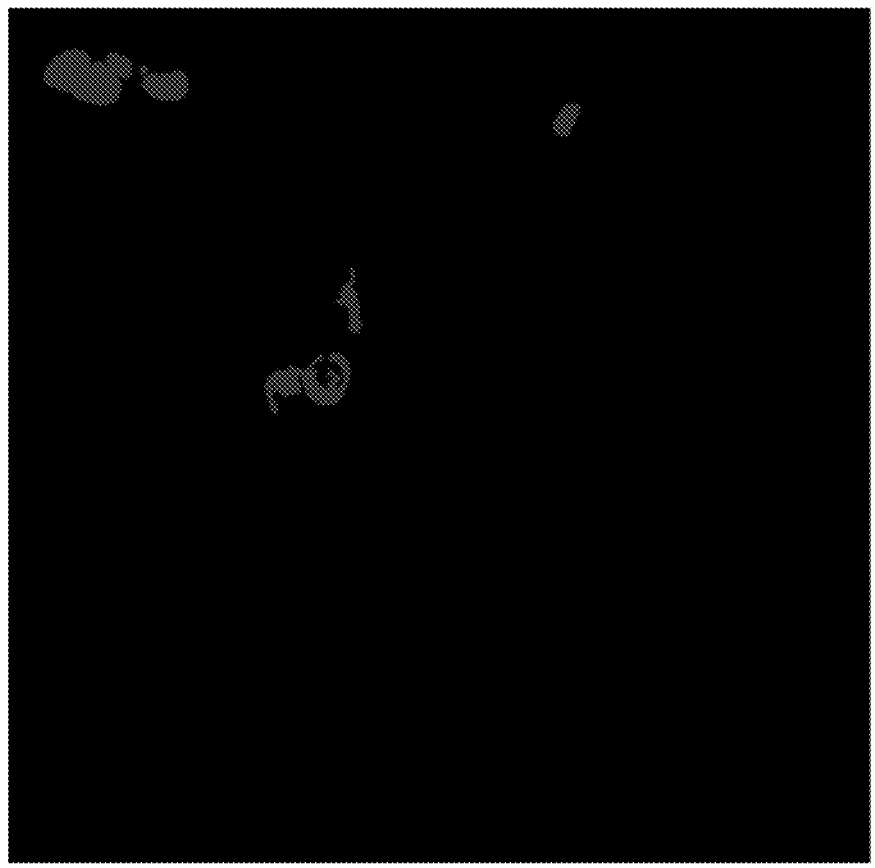
FIG. 13 is a diagram of a large duct segmentation result according to an embodiment.

FIG. 13 is a diagram of a large duct segmentation result according to an embodiment. After the duct size is determined, as shown in FIG. 13, the remaining images are identified as images of classification results of large ducts, and three predicted large ducts are carcinoma in situ, which are consistent with labeling results labeled by a person skilled in the art in advance.

Figure 14:
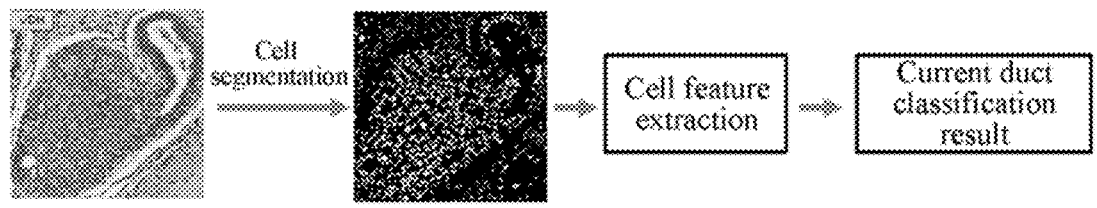
FIG. 14 is a flowchart of small duct classification according to an embodiment.

FIG. 14 is a flowchart of small duct classification according to an embodiment. In addition, as shown in FIG. 14, for each small duct, a cell segmentation-based algorithm may be used for implementing classification of the small duct. A specific operation may include: performing cell segmentation on a small duct image, and performing cell feature extraction based on a cell segmentation result, so as to obtain a current duct classification result.

Therefore, with reference to the foregoing four operations, it may be implemented that each ductal region is identified on a WSI image, and a category of a duct of each size can be further identified. The application example shows the image processing method provided in this disclosure, and a parallel strategy can be used for classifying lesions in the mammary duct by first segmenting the ducts, and then classifying the large duct and the small duct respectively. A large duct classification method may use an end-to-end semantic segmentation algorithm, and the advantage is that classification of the large duct can be handled at once on a larger image containing the large duct. In addition, a parallel small duct classification method is used, that is, a 2048 pixel-sized image under a 20× magnification is used for performing cell segmentation and classification based on a single small duct. Because the 2048 pixel-sized image under a 20× magnification is twice as clear as an image used in the large duct classification method, a lesion category of the small duct can be predicted more accurately, and classification problems of the large duct and the small duct can be processed more accurately and effectively.

Figure 15:
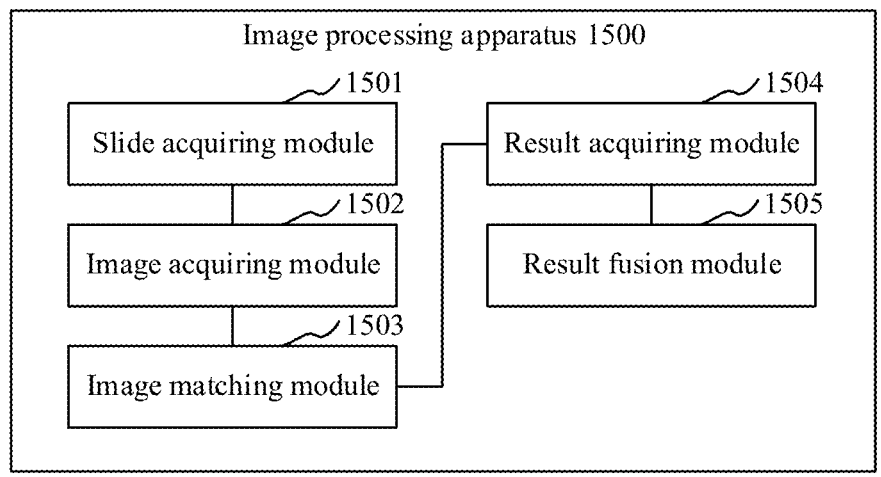
FIG. 15 is a block diagram of an image processing apparatus according to an embodiment.

FIG. 15 is a block diagram of an image processing apparatus according to an embodiment. In an embodiment, as shown in FIG. 15, FIG. 15 is a structural block diagram of an image processing apparatus according to an embodiment, and an image processing apparatus 1500 is provided. The apparatus 1500 includes a slide acquiring module 1501, configured to acquire a digital slide that includes to-be-classified objects of at least two sizes, an image acquiring module 1502, configured to acquire images of the to-be-classified object in at least two scales according to the digital slide; in the images of the to-be-classified object in the at least two scales, an image of a larger scale having a smaller image size and a higher image resolution than an image of a smaller scale, an image matching module 1503, configured to use, as a to-be-classified image of the to-be-classified object, an image whose image size matches a size of the to-be-classified object in the images of the to-be-classified object in the at least two scales, a result acquiring module 1504, configured to classify the to-be-classified object in the to-be-classified image based on a classification model corresponding to an image resolution of the to-be-classified image, to obtain a classification result of a to-be-classified object of each size, and a result fusion module 1505, configured to fuse the classification result of the to-be-classified object of each size to obtain classification results of the to-be-classified objects of the at least two sizes in the digital slide.

In an embodiment, the image acquiring module 1502 is further configured to acquire pixel physical sizes in the at least two scales as target pixel physical sizes, determine image resolutions of the images of the to-be-classified object in the at least two scales as target image resolutions, and zoom out, to image sizes corresponding to the target pixel physical size and the target image resolution, image sizes of images including the to-be-classified object in the digital slide, to obtain the images of the to-be-classified object in the at least two scales.

In an embodiment, the image acquiring module 1502 is further configured to, before the image size of the image that includes the to-be-classified object in the digital slide is zoomed out to the image sizes corresponding to the target pixel physical sizes and the target image resolutions to obtain the images of the to-be-classified object in the at least two scales, acquire an original pixel physical size of the digital slide, and determine, according to the original pixel physical size, the target image resolution, and the target pixel physical size, the image size of the image that includes the to-be-classified object in the digital slide.

In an embodiment, the image acquiring module 1502 is further configured to acquire a pixel physical size ratio, the pixel physical size ratio being a ratio of the target pixel physical size to the original pixel physical size, and determine, according to the target image resolution and the pixel physical size ratio, the image sizes of the images including the to-be-classified object in the digital slide.

In an embodiment, the image acquiring module 1502 is further configured to use a ratio of a target pixel horizontal physical size to an original pixel horizontal physical size as a pixel horizontal physical size ratio, and use a ratio of a target pixel vertical physical size to an original pixel vertical physical size as a pixel vertical physical size ratio, the target pixel physical size ratio including the pixel horizontal physical size ratio and the pixel vertical physical size ratio, the target pixel physical size including the target pixel horizontal physical size and the target pixel vertical physical size, and the original pixel physical size including the original pixel horizontal physical size and the original pixel vertical physical size, and use a product of a target image horizontal resolution and a pixel horizontal physical size ratio as an image horizontal size of the image including the to-be-classified object in the digital slide, and use a product of a target image vertical resolution and a pixel vertical physical size ratio as an image vertical size of the image including the to-be-classified object in the digital slide, the image size including the image horizontal size and the image vertical size, and the target image resolution including the target image horizontal resolution and the target image vertical resolution.

In an embodiment, the images of the to-be-classified object in the at least two scales include a first image corresponding to a first scale and a second image corresponding to a second scale, and the first scale is less than the second scale, and the image matching module 1503 is further configured to use the first image whose image size is greater than a size of the to-be-classified object as the to-be-classified image of the to-be-classified object, in a case that the size of the to-be-classified object is greater than an image size of the second image.

In an embodiment, the image matching module 1503 is further configured to, before the using the first image whose image size is greater than a size of the to-be-classified object as the to-be-classified image of the to-be-classified object, in a case that the size of the to-be-classified object is greater than an image size of the second image, acquire a contour feature of the to-be-classified object, and acquire the size of the to-be-classified object according to the contour feature.

In an embodiment, the image matching module 1503 is further configured to: acquire a segmentation result of the to-be-classified object on the first image by using a segmentation model corresponding to the first scale, and acquire the contour feature according to the segmentation result.

In an embodiment, the image matching module 1503 is further configured to acquire, according to the contour feature, an image range occupied by the to-be-classified object in the first image, and use the image range occupied by the to-be-classified object in the first image as the size of the to-be-classified object.

In an embodiment, the image matching module 1503 is further configured to: before the using the first image whose image size is greater than a size of the to-be-classified object as the to-be-classified image of the to-be-classified object, in a case that the size of the to-be-classified object is greater than an image size of the second image, determine that the size of the to-be-classified object is greater than the image size of the second image, in a case that a horizontal image range occupied by the to-be-classified object in the first image is greater than a horizontal image size of the second image, or in a case that a vertical image range occupied by the to-be-classified object in the first image is greater than a vertical image size of the second image, the image range occupied by the to-be-classified object in the first image including the horizontal image range and the vertical image range.

In an embodiment, the images of the to-be-classified object in the at least two scales include a first image corresponding to a first scale and a second image corresponding to a second scale, and the first scale is less than the second scale, and the result acquiring module 1504 is further configured to: classify, in a case that the to-be-classified image is the first image, the to-be-classified object in the first image by using an image semantic classification model as a classification model corresponding to an image resolution of the first image, to obtain a classification result of the to-be-classified object in the first image, and classify, in a case that the to-be-classified image is the second image, the to-be-classified object in the second image by using a local feature classification model as a classification model corresponding to an image resolution of the second image, to obtain a classification result of the to-be-classified object in the second image.

Figure 16:
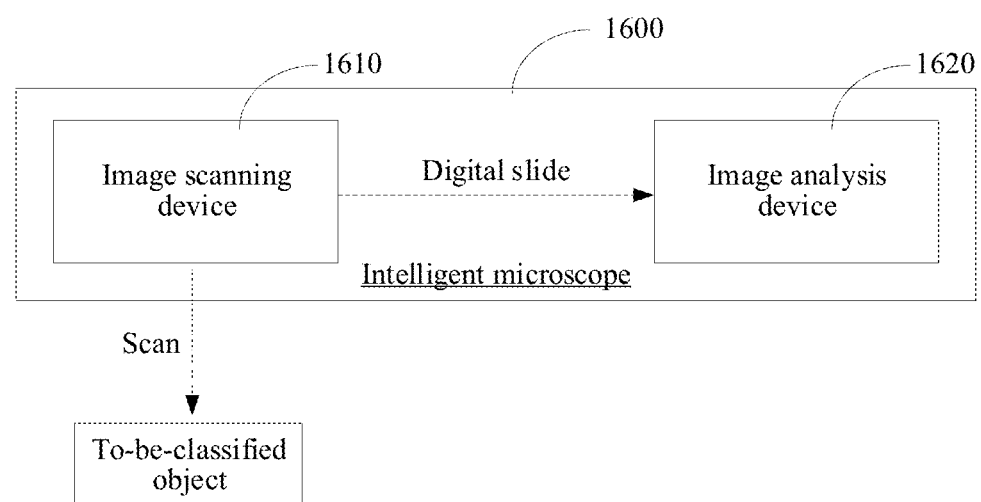
FIG. 16 is a block diagram of an intelligent microscope (or smart microscope) according to an embodiment.

FIG. 16 is a block diagram of an intelligent microscope according to an embodiment. An embodiment further provides an intelligent microscope. As shown in FIG. 16, FIG. 16 is a structural block diagram of an intelligent microscope according to an embodiment. The intelligent microscope 1600 may include an image scanning device 1610 and an image analysis device 1620.

The image scanning device 1610 is configured to scan a to-be-classified object to obtain a digital slide of the to-be-classified object, and transmit the digital slide to the image analysis device 1620, and the image analysis device 1620 is configured to perform the operation of the image processing method described in any one of the foregoing embodiments.

The intelligent microscope provided in the foregoing embodiment may be applied to lesion classification on a to-be-classified object such as a mammary duct. The image scanning device 1610 acquires a digital slide including mammary ducts of various sizes, and classifies them by using the image analysis device 1620. The image analysis device 1620 may be configured with a processor with an image processing function. The processor performs the operation of the image processing method in any one of the foregoing embodiments, to perform lesion classification on mammary ducts of various sizes, so as to implement precise classification on mammary ducts of various sizes included in the digital slide, and improve classification accuracy.

Figure 17:
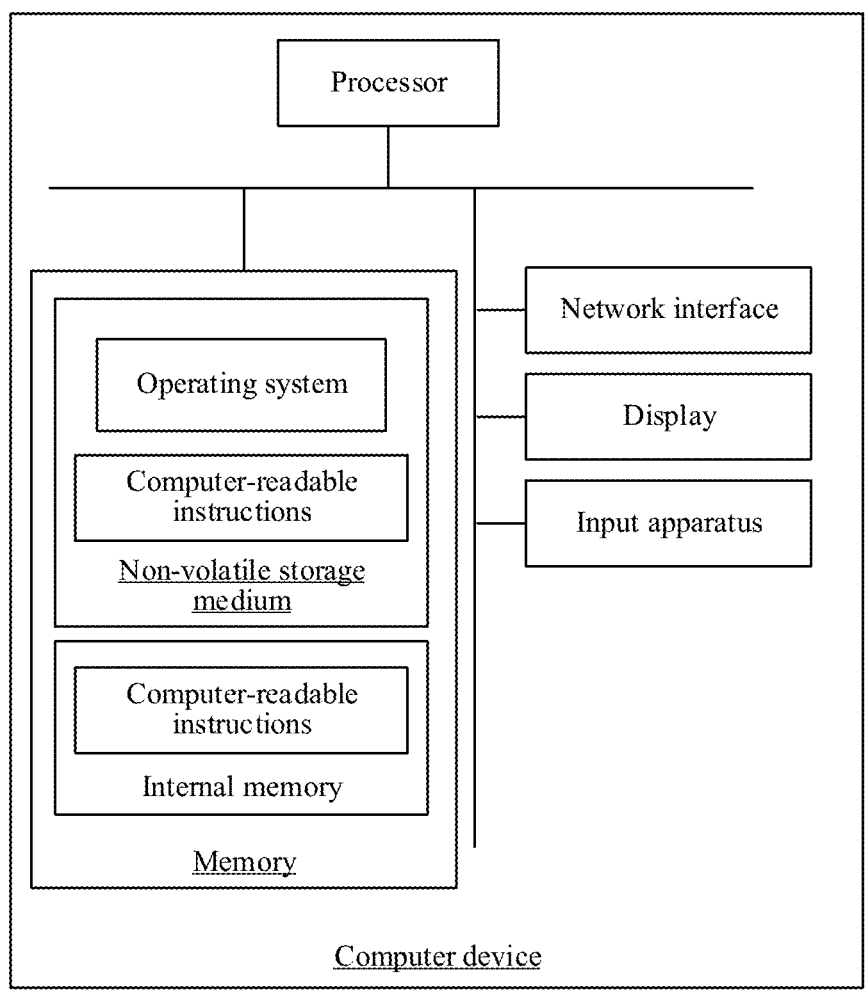
FIG. 17 is a block diagram of a computer device according to an embodiment.

FIG. 17 is a block diagram of a computer device according to an embodiment. The computer device may specifically be the image processing device 100 shown in FIG. 1. As shown in FIG. 17, the computer device includes a processor, a memory, a network interface, an input apparatus, and a display screen that are connected by a system bus. The memory includes a non-volatile storage medium and an internal memory. The non-volatile storage medium of the computer device stores an operating system, and may further store computer-readable instructions. The computer-readable instructions, when executed by the processor, may cause the processor to perform the image processing method. The internal memory may also store computer-readable instructions, and the computer-readable instructions, when executed by a processor, may cause the processor to perform the image processing method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

A person skilled in the art may understand that, the structure shown in FIG. 17 is only a block diagram of a part of a structure related to a solution of this disclosure and does not limit the computer device to which the solution of this disclosure is applied. Specifically, the computer device may include more or fewer components than those in the drawings, or include a combination of some components, or include different component layouts.

In an embodiment, a computer device is provided, including: a memory and a processor. The memory stores computer-readable instructions, the computer-readable instructions, when executed by the processor, causing the processor to perform the operations in the foregoing image processing method. The operations in the image processing method may be the operations in the image processing method in the foregoing embodiments.

In an embodiment, a computer-readable storage medium is provided. The computer-readable storage medium stores computer-readable instructions, the computer-readable instructions, when executed by the processor, causing the processor to perform the operations in the foregoing image processing method. The operations in the image processing method may be the operations in the image processing method in the foregoing embodiments.

In an embodiment, a computer-readable instruction product or computer-readable instructions are provided, the computer-readable instruction product or the computer-readable instructions include computer instructions, and the computer instructions are stored in the computer-readable storage medium. The processor of the computer device reads the computer instructions from the computer-readable storage medium, and the processor executes the computer instructions, to cause the computer device to perform the operations in the method embodiments.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a storage, a database, or another medium used in the embodiments provided in this disclosure may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

The technical features in the foregoing embodiments may be randomly combined. For concise description, not all possible combinations of the technical features in the embodiments are described. However, provided that combinations of the technical features do not conflict with each other, the combinations of the technical features are considered as falling within the scope described in this specification.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The foregoing embodiments show only several implementations of this disclosure and are described in detail, which, however, are not to be construed as a limitation to the patent scope of this disclosure. A person of ordinary skill in the art may further make several variations and improvements without departing from the ideas of this disclosure, and such variations and improvements all fall within the protection scope of this disclosure. Therefore, the protection scope of this disclosure shall be subject to the protection scope of the appended claims.

What is claimed is:

1. An image processing method, performed by at least one processor, the method comprising:
   acquiring a digital slide comprising objects of at least two sizes, the objects comprising a first object of a first size and a second object of a second size different from the first size;
   for each of the first object and the second object, acquiring images of a corresponding object in at least two scales based on the digital slide, wherein the acquired images of the corresponding object in the at least two scales comprise an image of a larger scale and an image of a smaller scale, the image of the larger scale having a smaller image size and a higher image resolution than the image of the smaller scale;
   for each of the first object and the second object, determining, from the images of the corresponding object in the at least two scales, an image having an image size that corresponds to a size of the corresponding object;
   obtaining a first classification result of the first object by classifying the first object in the determined image for the first object based on a classification model corresponding to a first image resolution of the determined image for the first object;
   obtaining a second classification result of the second object by classifying the second object in the determined image for the second object based on a classification model corresponding to a second image resolution of the determined image for the second object; and
   obtaining classification results of the first object and the second object by fusing the first classification result and the second classification result.

2. The method of claim 1, wherein the acquiring the images of the corresponding object in the at least two scales based on the digital slide comprises:
   acquiring a pixel physical size in the at least two scales as a target pixel physical size;
   determining an image resolution of the images of the corresponding object in the at least two scales as a target image resolution; and
   obtaining the images of the corresponding object in the at least two scales by zooming out of images comprising the corresponding object in the digital slide to image sizes corresponding to the target pixel physical size and the target image resolution.

3. The method of claim 2, wherein, before the zooming out, the method further comprises:
   acquiring an original pixel physical size of the digital slide; and
   determining, based on the original pixel physical size, the target image resolution and the target pixel physical size, the image sizes of the images of the corresponding object in the digital slide.

4. The method of claim 3, wherein the determining, based on the original pixel physical size, the target image resolution and the target pixel physical size, comprises:
acquiring a pixel physical size ratio, the pixel physical size ratio being a first ratio of the target pixel physical size to the original pixel physical size; and
determining, based the target image resolution and the pixel physical size ratio, the image sizes of the images of the corresponding object in the digital slide.

5. The method of claim 4, wherein the acquiring the pixel physical size ratio comprises:
using a second ratio of a target pixel horizontal physical size to an original pixel horizontal physical size as a pixel horizontal physical size ratio; and
using a third ratio of a target pixel vertical physical size to an original pixel vertical physical size as a pixel vertical physical size ratio,
wherein the pixel physical size ratio comprises the pixel horizontal physical size ratio and the pixel vertical physical size ratio,
wherein the target pixel physical size comprises the target pixel horizontal physical size and the target pixel vertical physical size,
wherein the original pixel physical size comprising the original pixel horizontal physical size and the original pixel vertical physical size;
wherein the determining, based on the target image resolution and the pixel physical size ratio, the image sizes of the images of the corresponding object in the digital slide comprises:
using a first product of a target image horizontal resolution and the pixel horizontal physical size ratio as an image horizontal size of the images of the corresponding object in the digital slide; and
using a second product of a target image vertical resolution and the pixel vertical physical size ratio as an image vertical size of the images of the corresponding object in the digital slide,
wherein the image sizes comprise the image horizontal size and the image vertical size, and
wherein the target image resolution comprises the target image horizontal resolution and the target image vertical resolution.

6. The method of claim 1, wherein the determining the image having the image size that corresponds to the size of the corresponding object comprises:
using the image of the smaller scale as a corresponding image of the corresponding object, based on the size of the corresponding object being greater than an image size of the image of the smaller scale.

7. The method of claim 6, wherein, before the using the image of the smaller scale as the corresponding image of the corresponding object, the method further comprises:
acquiring a contour feature of the corresponding object; and
acquiring the size of the corresponding object based on the contour feature.

8. The method of claim 7, wherein the acquiring the contour feature of the corresponding object comprises:
acquiring a segmentation result of the corresponding object on the image of the smaller scale based on a segmentation model corresponding to the smaller scale; and
acquiring the contour feature based on the segmentation result.

9. The method of claim 7, wherein the acquiring the size of the corresponding object based on the contour feature comprises:
acquiring, based on the contour feature, an image range occupied by the corresponding object in the image of the smaller scale; and
using the image range occupied by the corresponding object in the image of the smaller scale as the size of the corresponding object.

10. The method of claim 9, wherein, before the using the image of the smaller scale as the corresponding image of the corresponding object, the method further comprises:
determining that the size of the corresponding object is greater than an image size of the image of the larger scale, based on:
a horizontal image range occupied by the corresponding object in the image of the smaller scale being greater than a horizontal image size of the image having the larger scale, or
a vertical image range occupied by the corresponding object in the image of the smaller scale being greater than a vertical image size of the image of the larger scale,
wherein the image range occupied by the corresponding object in the image of the smaller scale comprises the horizontal image range and the vertical image range.

11. An apparatus, comprising:
at least one memory configured to store computer program code; and
at least one processor configured to access said computer program code and operate as instructed by said computer program code, said computer program code comprising:
first acquiring code configured to cause the at least one processor to acquire a digital slide comprising objects of at least two sizes, the objects comprising a first object of a first size and a second object of a second size different from the first size;
second acquiring code configured to cause the at least one processor to, for each of the first object and the second object, acquire images of a corresponding object in at least two scales based on the digital slide, wherein the acquired images of the corresponding object in the at least two scales comprise an image of a larger scale and an image of a smaller scale, the image of the larger scale having a smaller image size and a higher image resolution than the image of the smaller scale;
first determining code configured to cause the at least one processor to, for each of the first object and the second object, determine, from the images of the corresponding object in the at least two scales, an image having an image size that corresponds to a size of the corresponding object;
first obtaining code configured to cause the at least one processor to obtain a first classification result of the first object by classifying the first object in the determined image for the first object based on a classification model corresponding to a first image resolution of the determined image for the first object;
second obtaining code configured to cause the at least one processor to obtain a second classification result of the second object by classifying the second object in the determined image for the second object based on a classification model corresponding to a second image resolution of the determined image for the second object; and third obtaining code configured to cause the at least one processor to obtain classification results of the first object and the second object by fusing the first classification result and the second classification result.

12. The apparatus of claim 11, wherein the second acquiring code is further configured to cause the at least one processor to:
acquire a pixel physical size in the at least two scales as a target pixel physical size;
determine an image resolution of the images of the corresponding object in the at least two scales as a target image resolution; and
obtain the images of the corresponding object in the at least two scales by zooming out of images comprising the corresponding object in the digital slide to image sizes corresponding to the target pixel physical size and the target image resolution.

13. The apparatus of claim 12, wherein the computer program code further comprises, for execution prior to the zooming out:
third acquiring code configured to cause the at least one processor to acquire an original pixel physical size of the digital slide; and
second determining code configured to cause the at least one processor to determine, based on the original pixel physical size, the target image resolution and the target pixel physical size, the image sizes of the images of the corresponding object in the digital slide.

14. The apparatus of claim 13, wherein the first determining code is further configured to cause the at least one processor to:
acquire a pixel physical size ratio, the pixel physical size ratio being a first ratio of the target pixel physical size to the original pixel physical size; and
determine, based the target image resolution and the pixel physical size ratio, the image sizes of the images of the corresponding object in the digital slide.

15. The apparatus of claim 14, wherein the acquiring the pixel physical size ratio comprises:
using a second ratio of a target pixel horizontal physical size to an original pixel horizontal physical size as a pixel horizontal physical size ratio; and
using a third ratio of a target pixel vertical physical size to an original pixel vertical physical size as a pixel vertical physical size ratio,
wherein the pixel physical size ratio comprises the pixel horizontal physical size ratio and the pixel vertical physical size ratio,
wherein the target pixel physical size comprises the target pixel horizontal physical size and the target pixel vertical physical size,
wherein the original pixel physical size comprising the original pixel horizontal physical size and the original pixel vertical physical size;
wherein the determining, based on the target image resolution and the pixel physical size ratio, the image sizes of the images of the corresponding object in the digital slide comprises:
using a first product of a target image horizontal resolution and the pixel horizontal physical size ratio as an image horizontal size of the images of the corresponding object in the digital slide; and
using a second product of a target image vertical resolution and the pixel vertical physical size ratio as an image vertical size of the images of the corresponding object in the digital slide,
wherein the image sizes comprise the image horizontal size and the image vertical size, and
wherein the target image resolution comprises the target image horizontal resolution and the target image vertical resolution.

16. The apparatus of claim 11, wherein the first determining code is further configured to cause the at least one processor to:
use the image of the smaller scale as a corresponding image of the corresponding object, based on the size of the corresponding object being greater than an image size of the image of the smaller scale.

17. The apparatus of claim 16, wherein the computer program code further comprises, for execution prior to the first using code:
fourth acquiring code configured to cause the at least one processor to a contour feature of the corresponding object; and
fifth acquiring code configured to cause the at least one processor to acquire the size of the corresponding object based on the contour feature.

18. The apparatus of claim 17, wherein the fourth acquiring code is further configured to cause the at least one processor to:
acquire a segmentation result of the corresponding object on the image of the smaller scale based on a segmentation model corresponding to the smaller scale; and
acquire the contour feature based on the segmentation result.

19. The apparatus of claim 17, wherein the fifth acquiring code is further configured to cause the at least one processor to:
acquire, based on the contour feature, an image range occupied by the corresponding object in the image of the smaller scale; and
use the image range occupied by the corresponding object in the image of the smaller scale as the size of the corresponding object.

20. A non-transitory computer-readable storage medium storing computer instructions that, when executed by at least one processor of a device, cause the at least one processor to:
acquire a digital slide comprising objects of at least two sizes, the objects comprising a first object of a first size and a second object of a second size different from the first size;
for each of the first object and the second object, acquire images of a corresponding object in at least two scales based on the digital slide, wherein the acquired images of the corresponding object in the at least two scales comprise an image of a larger scale and an image of a smaller scale, the image of the larger scale having a smaller image size and a higher image resolution than the image of the smaller scale;
for each of the first object and the second object, determine, from the images of the corresponding object in the at least two scales, an image having an image size that corresponds to a size of the corresponding object;
obtain a first classification result of the first object by classifying the first object in the determined image for the first object based on a classification model corresponding to a first image resolution of the determined image for the first object;
obtain a second classification result of the second object by classifying the second object in the determined image for the second object based on a classification model corresponding to a second image resolution of the determined image for the second object; and obtain classification results of the first object and the second object by fusing the first classification result and the second classification result.

* * * * *